United States Patent
Bouchard et al.

[19]

[11] Patent Number: 6,108,995

[45] Date of Patent: Aug. 29, 2000

[54] BLOCK FOR THE MORTARLESS CONSTRUCTION OF A WALL

[75] Inventors: Michel Bouchard; Paul-Emile Lambert, both of Dolbeau; Marc Fortin, Albanel, all of Canada

[73] Assignee: Produits Alba, Inc., Quebec, Canada

[21] Appl. No.: 09/188,056

[22] Filed: Nov. 6, 1998

Related U.S. Application Data

[63] Continuation of application No. 08/607,238, Feb. 26, 1996, abandoned, which is a continuation-in-part of application No. 08/458,563, Jun. 2, 1995, abandoned.

[51] Int. Cl.[7] .................................. E04C 1/00; E04B 2/36
[52] U.S. Cl. .................................. 52/609; 52/284; 52/513; 52/604
[58] Field of Search .............................. 52/284, 562, 565, 52/568, 513, 596, 597, 603, 604, 605, 608, 609

[56] References Cited

U.S. PATENT DOCUMENTS

| | | |
|---|---|---|
| 865,654 | 9/1907 | Noack et al. . |
| 1,543,635 | 6/1925 | Wickson . |
| 1,833,442 | 11/1931 | Solon . |
| 1,981,324 | 11/1934 | Peterson . |
| 2,141,035 | 12/1938 | Daniels . |
| 2,269,509 | 1/1942 | Batelja . |
| 2,323,661 | 7/1943 | Hosbein . |
| 2,341,971 | 2/1944 | Antill . |
| 2,482,986 | 9/1949 | McClatchey et al. . |
| 2,550,945 | 5/1951 | Steinhage et al. . |
| 2,622,864 | 12/1952 | Hasche . |
| 2,833,027 | 2/1958 | Coberly . |
| 3,167,440 | 1/1965 | McVicker et al. . |
| 3,183,108 | 5/1965 | Rhodenbaugh et al. . |
| 3,221,614 | 12/1965 | Pertien . |
| 3,804,654 | 4/1974 | Liu . |
| 3,870,423 | 3/1975 | Peitz, Jr. . |
| 4,172,054 | 10/1979 | Ogawa et al. . |
| 4,386,964 | 6/1983 | Herbert . |
| 4,441,298 | 4/1984 | Limousin . |
| 4,698,942 | 10/1987 | Swartz . |

(List continued on next page.)

FOREIGN PATENT DOCUMENTS

| | | |
|---|---|---|
| 0 181 230 | 5/1986 | European Pat. Off. . |
| 0 191 908 | 8/1986 | European Pat. Off. . |
| 0 390 547 | 10/1990 | European Pat. Off. . |
| 0 395 534 | 10/1990 | European Pat. Off. . |
| 1 150 006 | 1/1958 | France . |
| 423962 | 10/1946 | Italy . |
| 8135 | 12/1839 | United Kingdom . |
| 5267 | 3/1902 | United Kingdom . |

OTHER PUBLICATIONS

"Novabrik Mortarless Technology Installation Guide"; Allan Block Corporation; pp. 1–26, 1997.

"Novabrik True Innovations of Mankind, Spring Issue '98"; Allan Block Corporation; pp. 1–4, 1998.

"Novabrik Mortarless Technology Technical Guide"; Allan Block Corporation; pp. 1–8, 1998.

"Novabrick Mortarless Technology" brochure; Allan Block Corporation; pp. 1–2, 1998.

"Novabrick Mortarless Technology" brochure; Allan Block Corporation; pp. 1–8, 1998.

"Novabrik—Mortarless Technology (http://www.alba.com/English/Novabrik.htm)"; the Alba Company, 1999.

"Novabrik (http://www.novabrikcanada.com/English/Product_Information/Product_Information.htm)"; Novabrik Canada, 1999.

"Novabrik Awards (http://www.novabrikcanada.com/English/Awards/Awards.htm)"; Novabrik Canada, 1999.

*Primary Examiner*—Carl D. Friedman
*Assistant Examiner*—Kevin D. Wilkens
*Attorney, Agent, or Firm*—Myers Bigel Sibley & Sajovec, P.A.

[57] ABSTRACT

A mortarless wall of a building structure has a plurality of blocks arranged in successive overlapping courses. Each of the blocks has a top, bottom, front and rear face disposed between opposed side ends. The blocks are able to interlock in the manner of shingles in a mortarless fashion.

52 Claims, 18 Drawing Sheets

U.S. PATENT DOCUMENTS

| | | |
|---|---|---|
| 4,711,606 | 12/1987 | Leling et al. . |
| 4,803,821 | 2/1989 | Funaki . |
| 4,856,245 | 8/1989 | Osawa . |
| 4,936,712 | 6/1990 | Glickman . |
| 5,077,952 | 1/1992 | Moore . |
| 5,205,675 | 4/1993 | Hamel . |
| 5,279,082 | 1/1994 | Scholta . |
| 5,282,700 | 2/1994 | Rodrique . |
| 5,337,527 | 8/1994 | Wagenaar . |
| 5,349,802 | 9/1994 | Kariniemi . |
| 5,428,934 | 7/1995 | Tomek . |

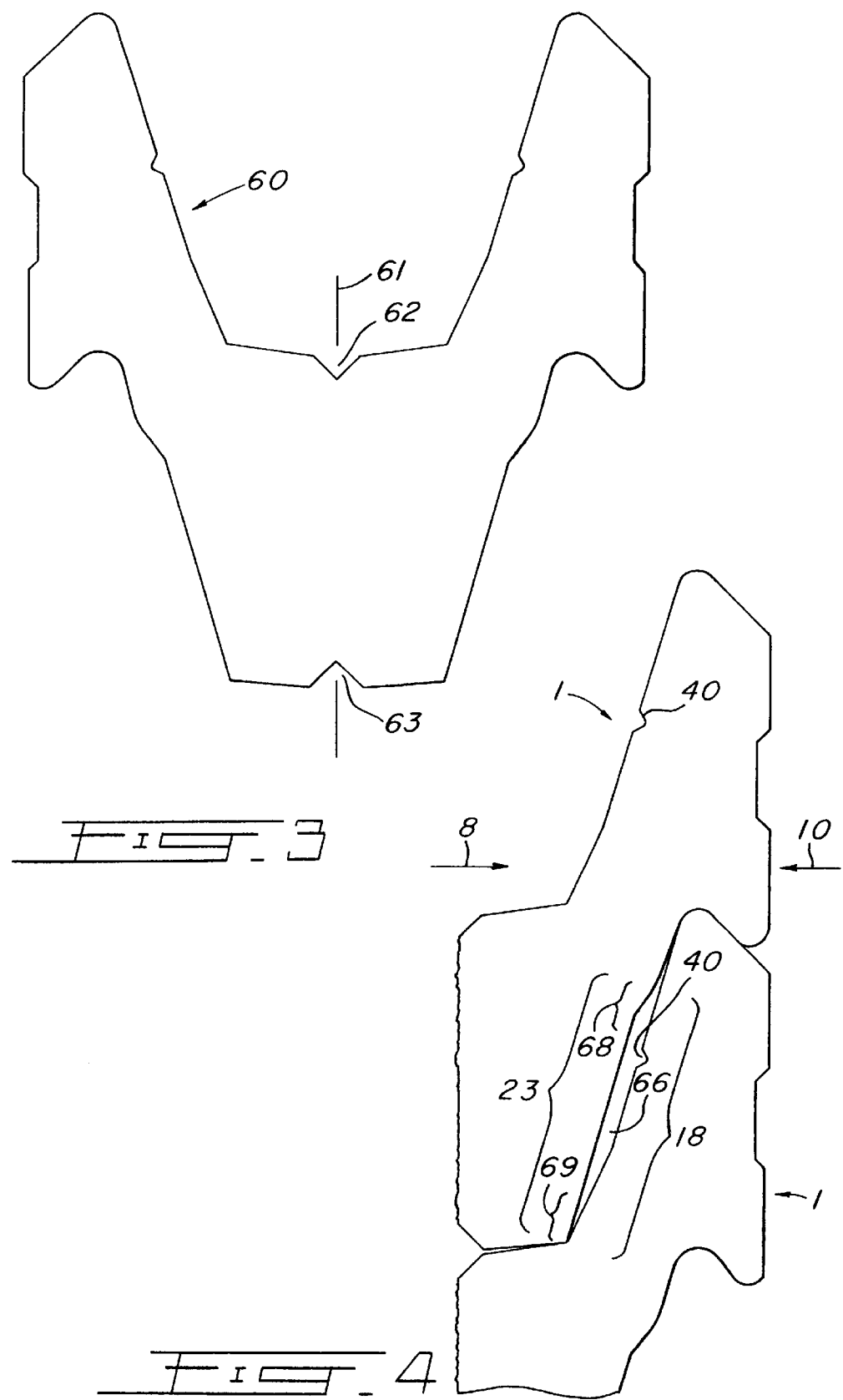

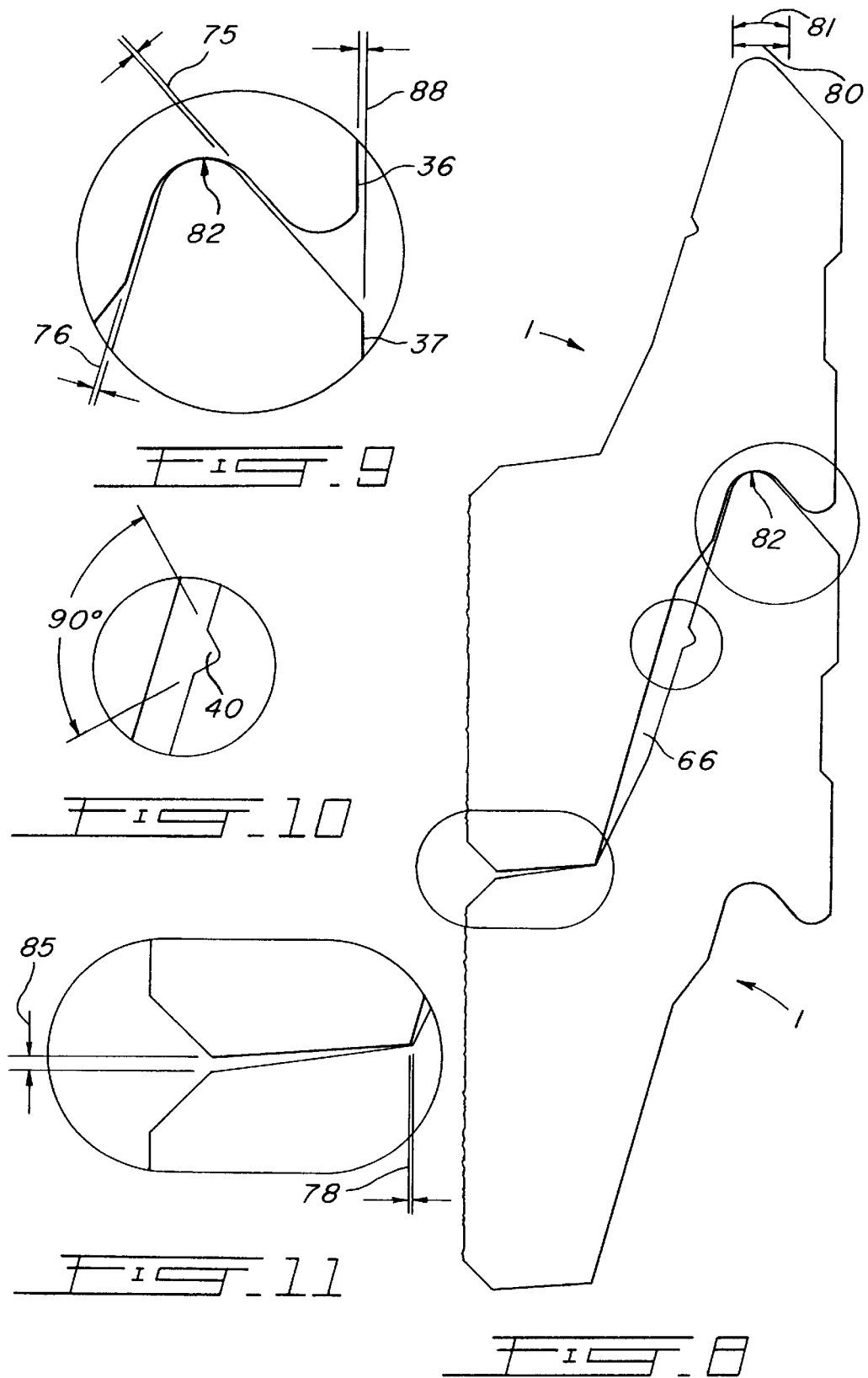

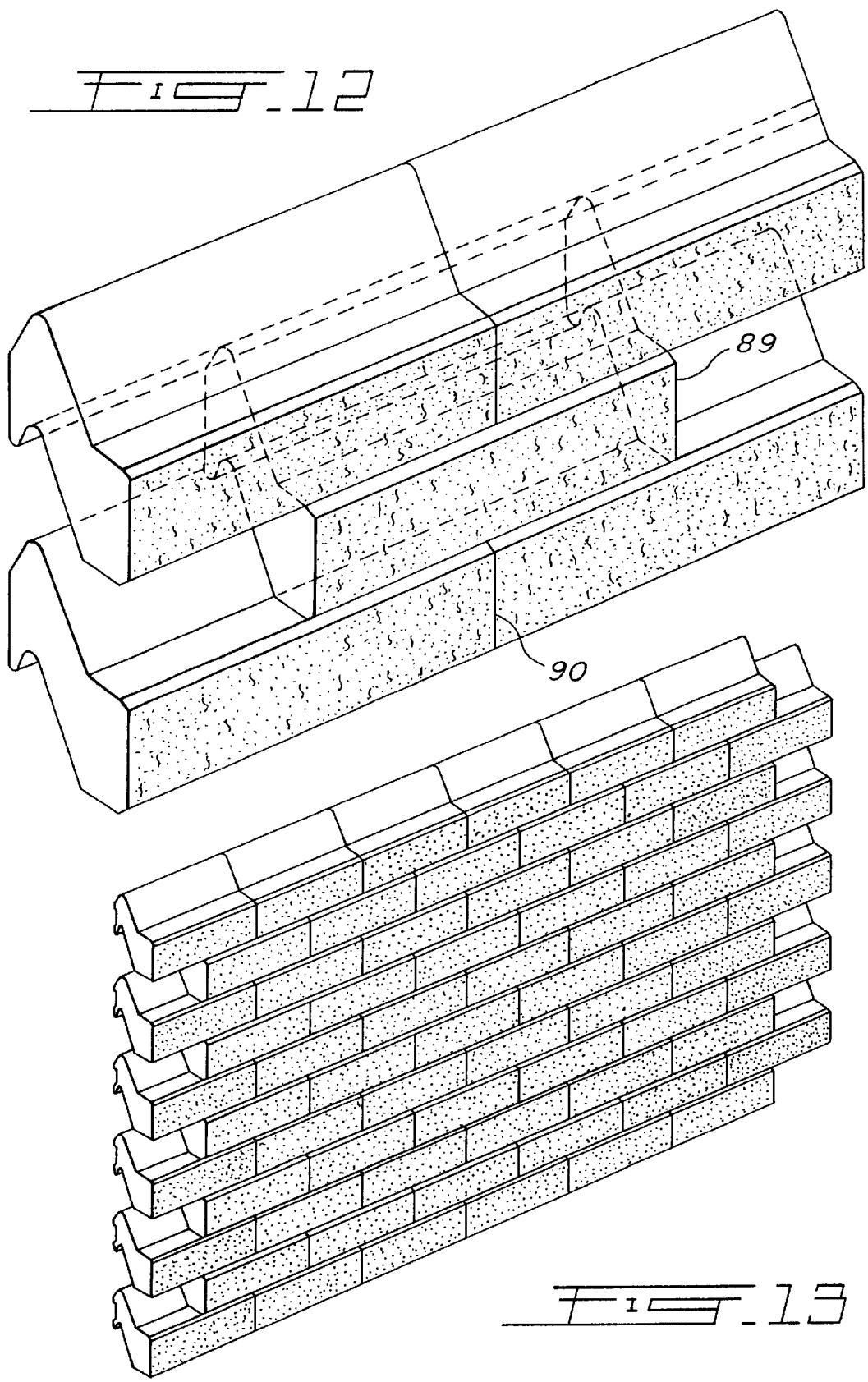

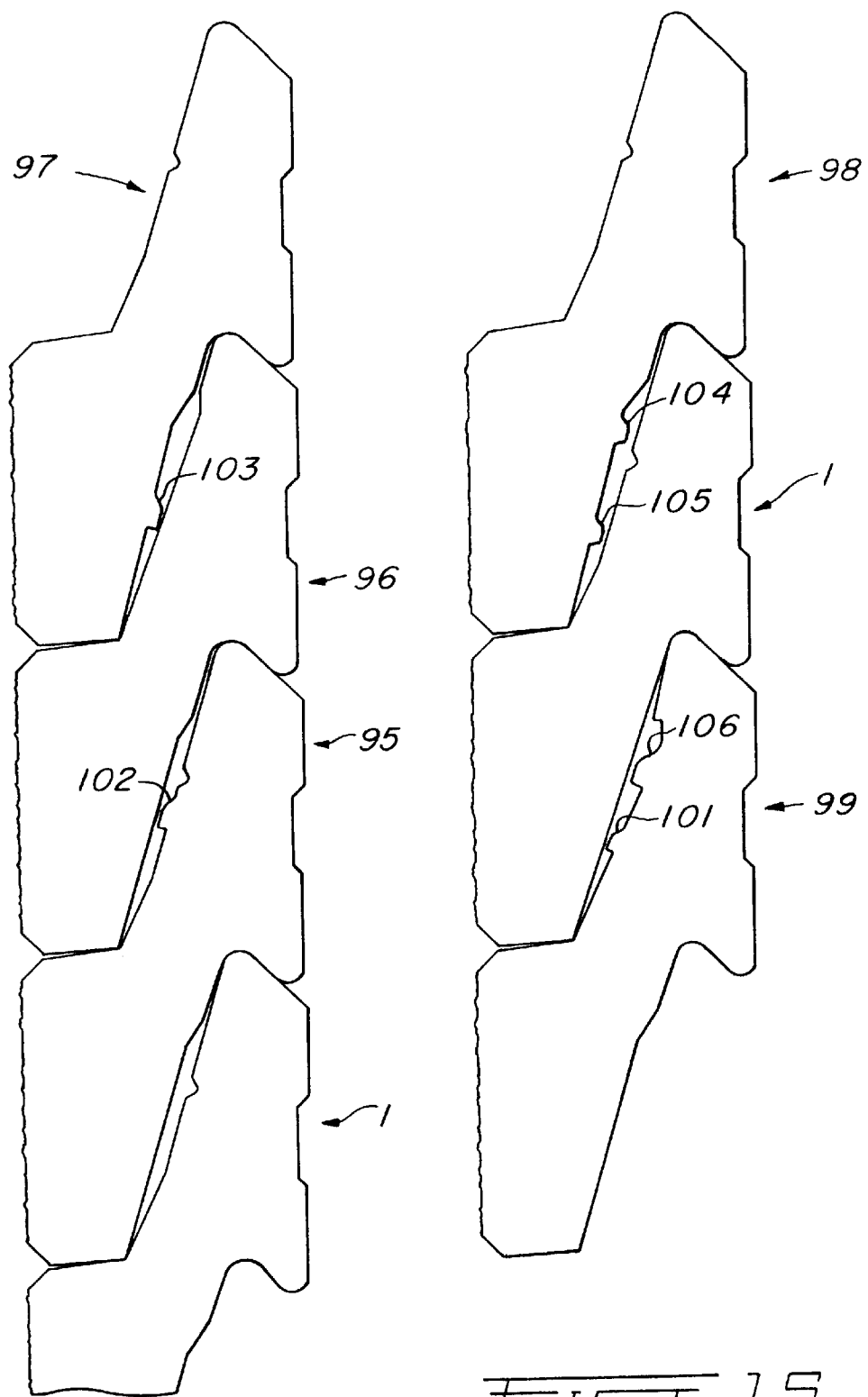

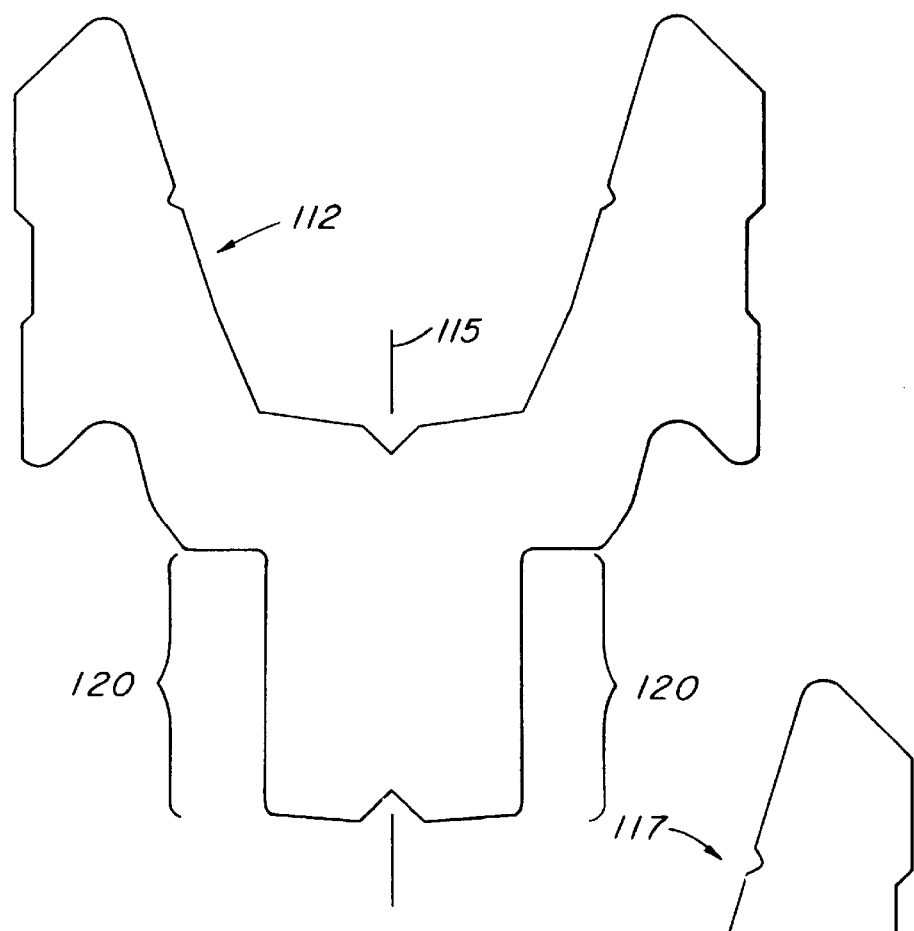
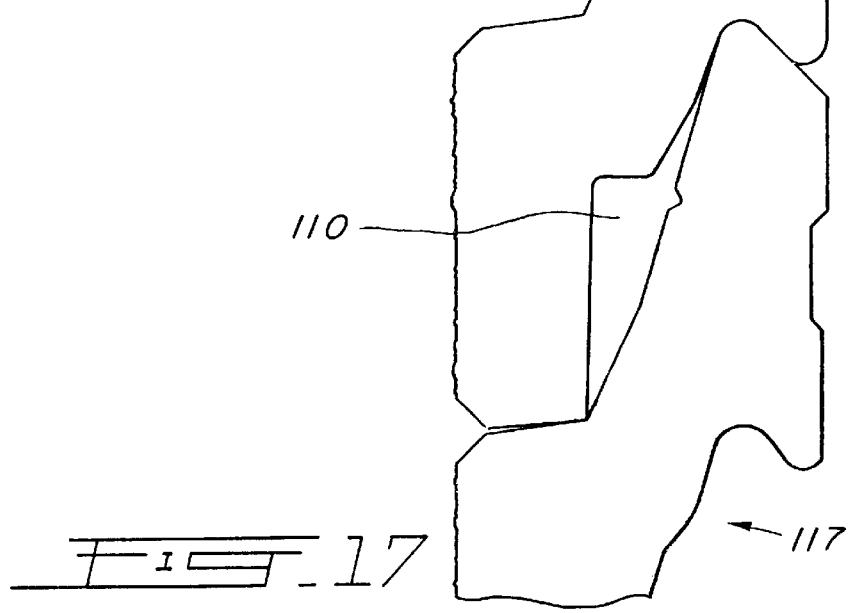

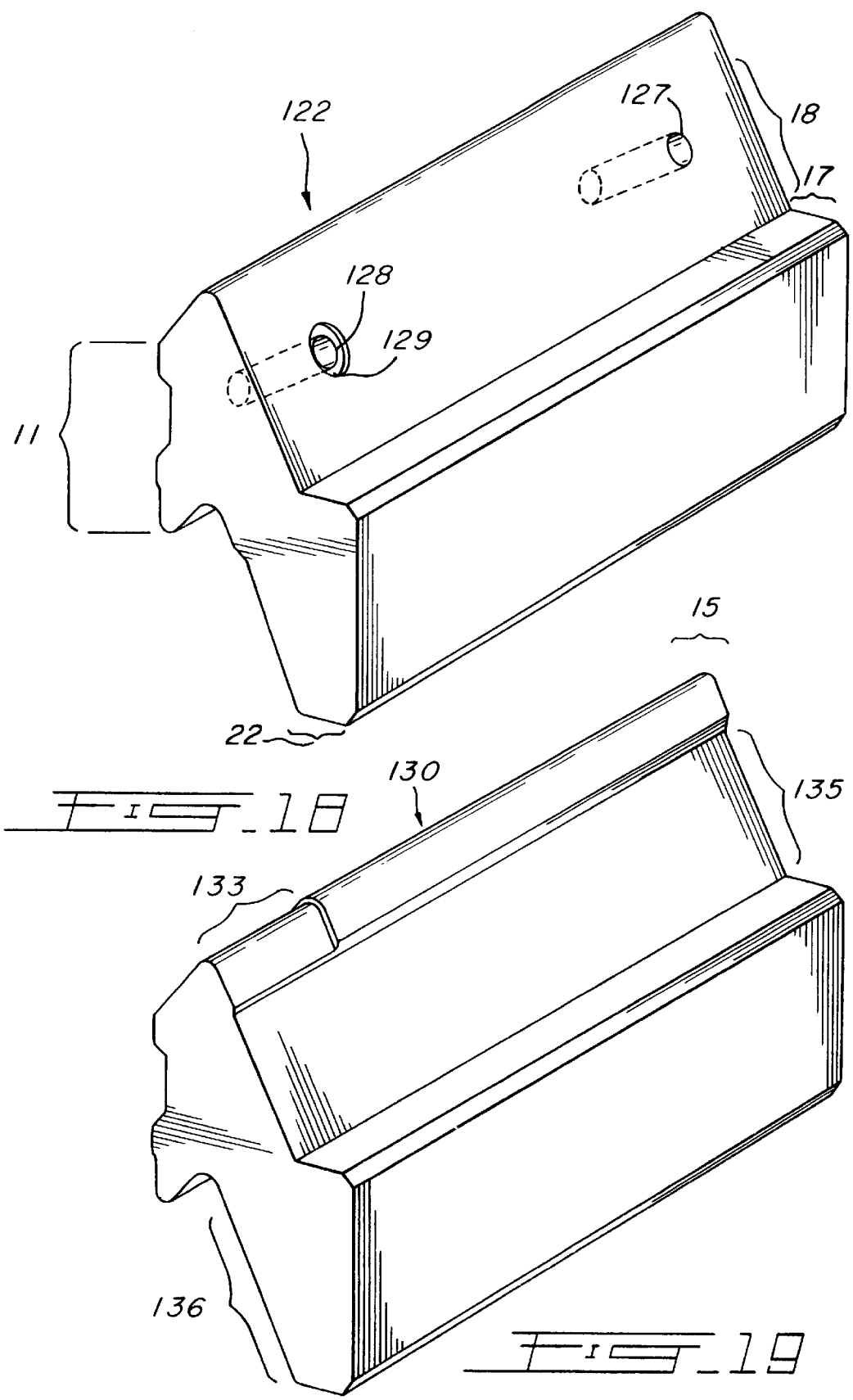

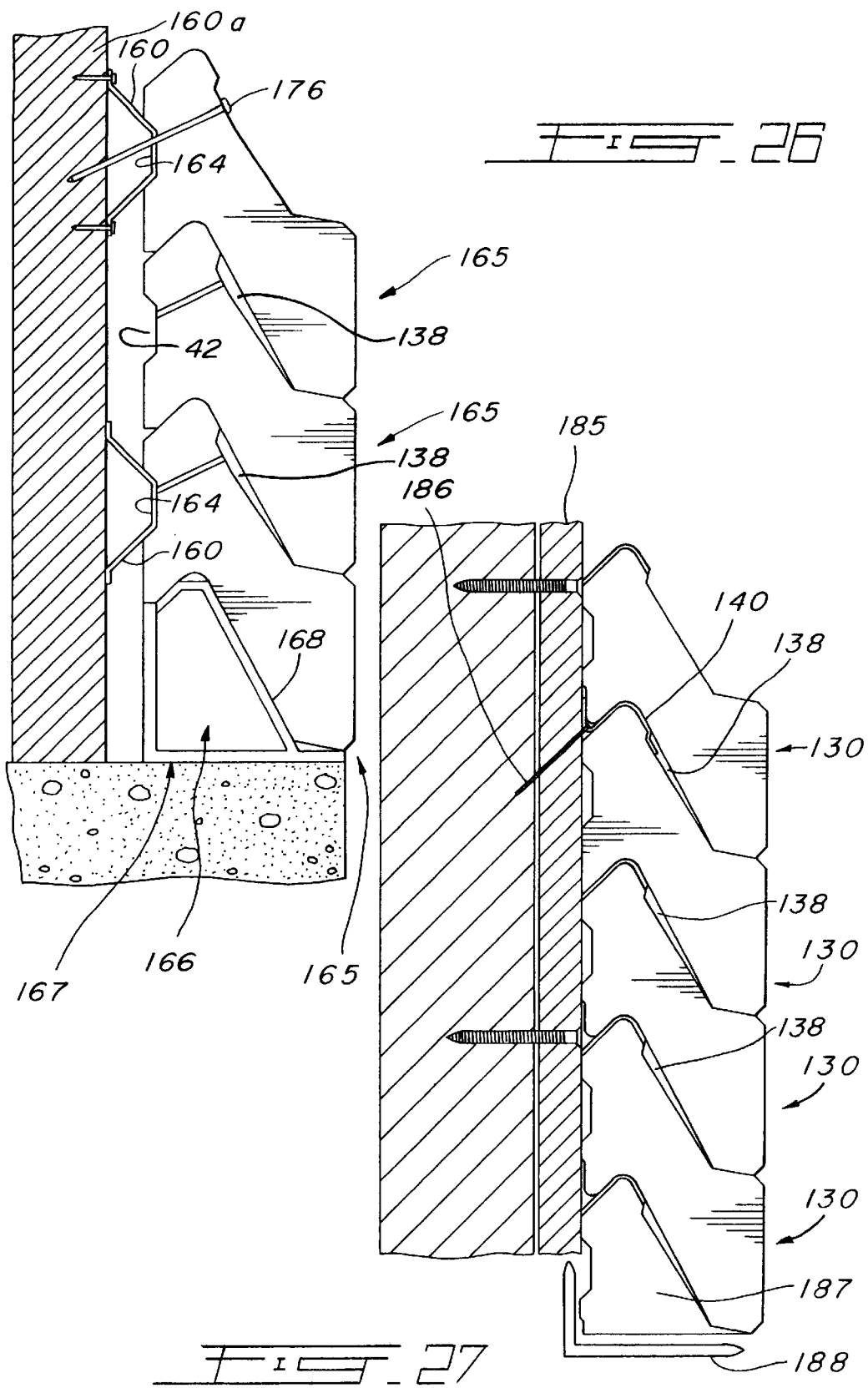

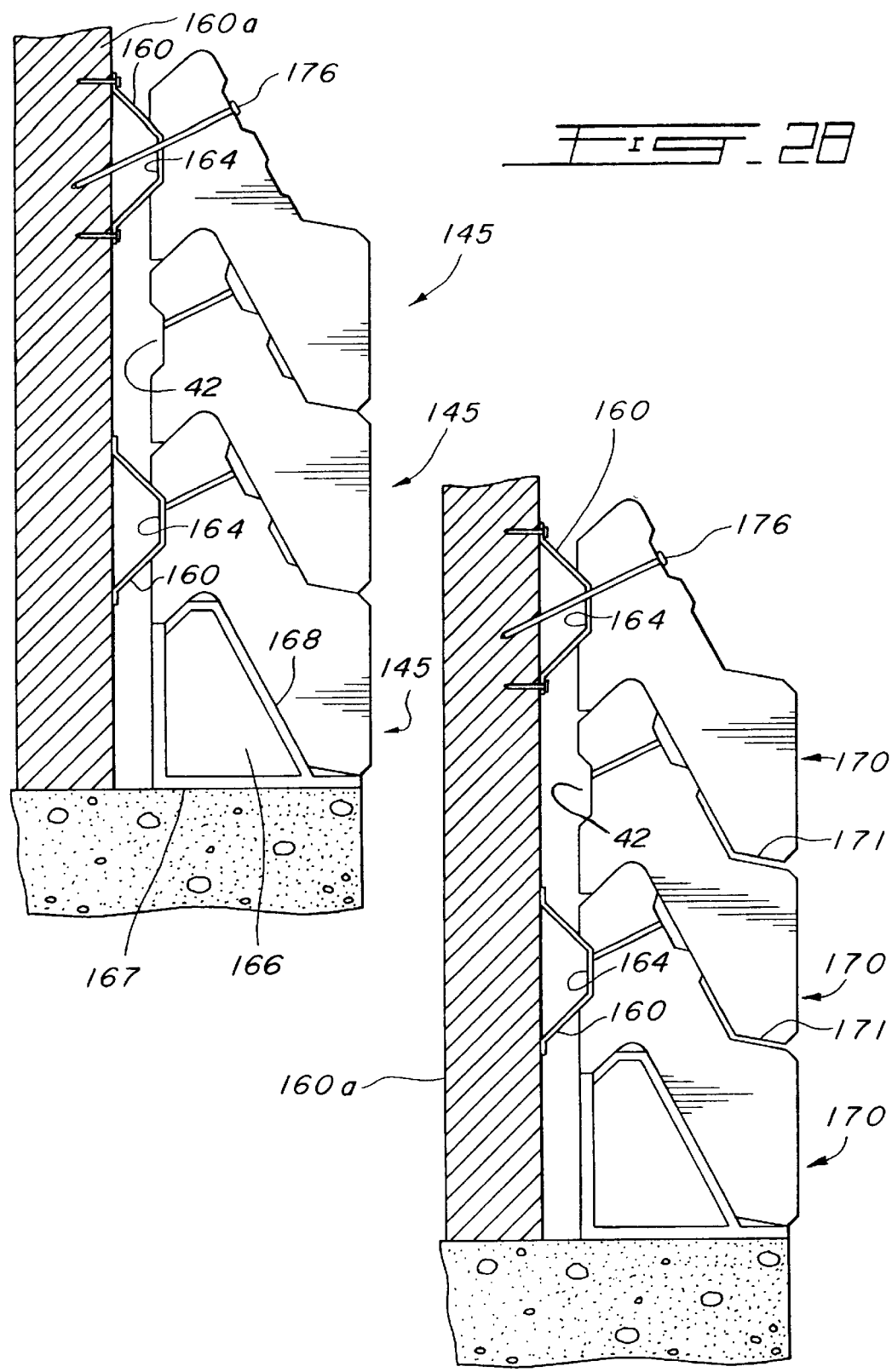

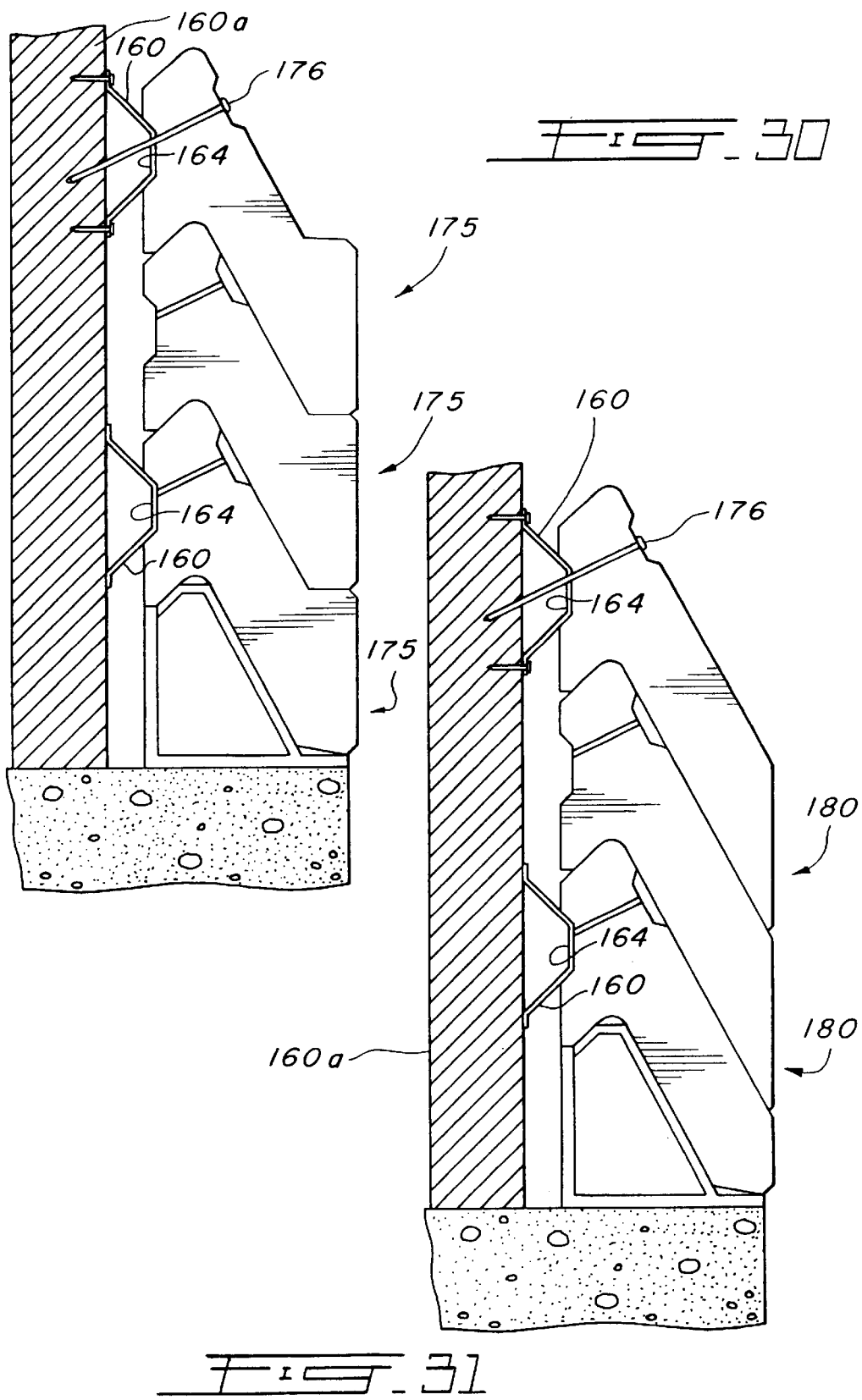

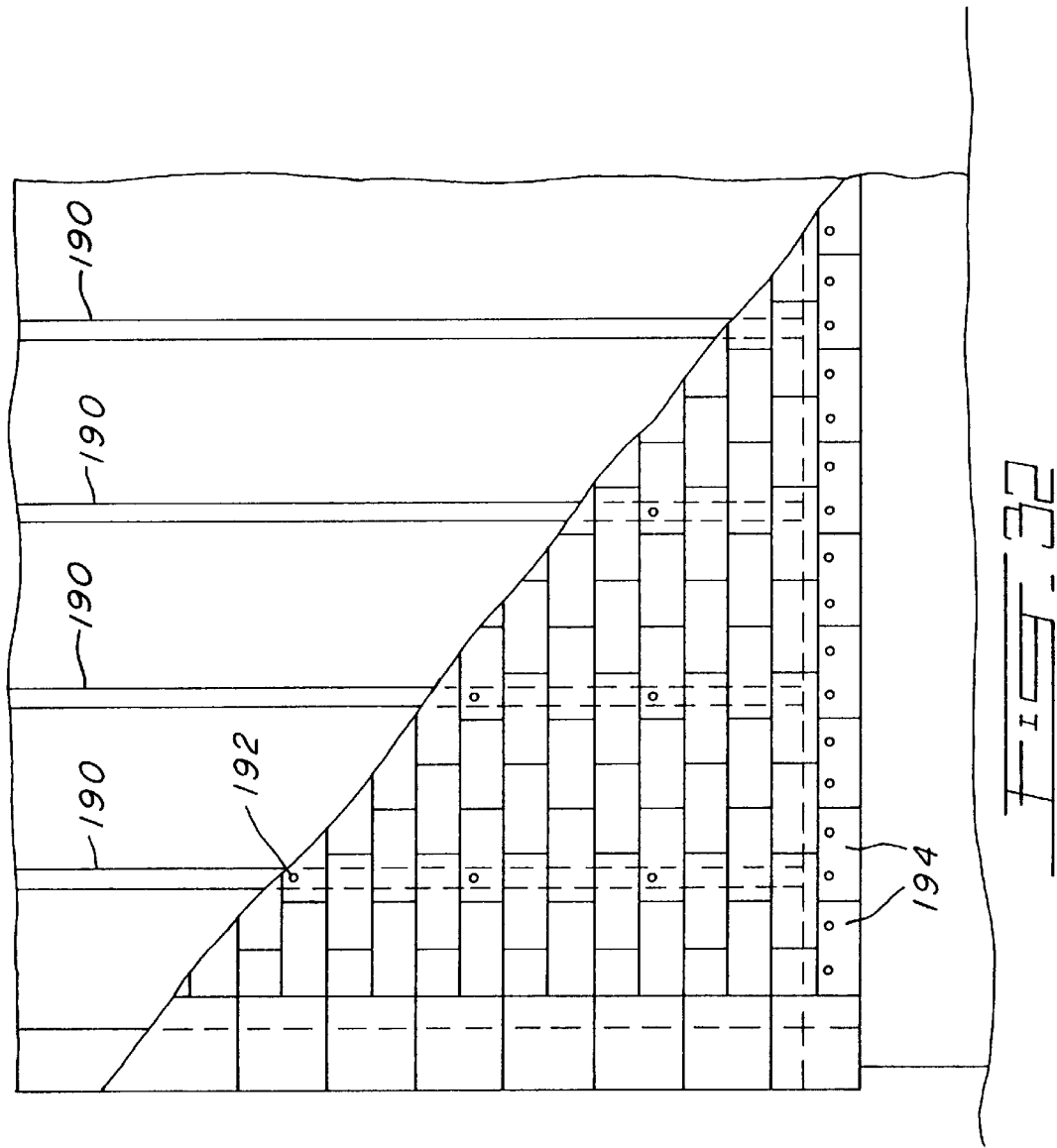

BLOCK FOR THE MORTARLESS CONSTRUCTION OF A WALL

The present application is a continuation of U.S. application Ser. No. 08/607,238, filed on Feb. 26, 1996, now abandoned, which is a Continuation in Part application of the U.S. patent application Ser. No. 08/458563 filed on Jun. 2, 1995, now abandoned.

The present invention generally relates to wall construction, and more particularly to a block for mortarless construction of a wall, e.g. a wall of a building structure. The invention also relates to a mortarless wall erected using such blocks.

The outside masonry walls of buildings are generally constructed using rectangular bricks assembled by mortar, or nailed thin asphalt shingles which are difficult to affix and require a very robust wall.

Known in the art is U.S. Pat. No. 2,341,971 (Antill), which describes a sectionally supported wall for furnaces or other high temperature chambers. The wall comprises an outer metal supporting structure having hanging members for supporting sections of the wall consisting of a series of courses of interengaging refractory rectangular blocks. The blocks in a course have interengaging small projections and recesses to engage with complementary recesses and projections of the adjacent lateral blocks to prevent lateral displacement of the blocks in the course. Certain blocks of the course are also provided with small projections and recesses to engage with the blocks of a course beneath and/or above, to prevent lateral displacement of the courses. However, due to the generally rectangular shape of the blocks, the wall is not adapted for outside construction because water may infiltrate between the blocks through spaces or by cavitation, i.e. due to capillary action and/or under the influence of wind during a rain storm. Furthermore, installation of the blocks may take time because they must follow an appropriate pattern to match with the positions of the hanging members and the supporting structure.

British patent number 5267 relates to a brick for use with mortar. This British patent does not, however, deal with the problem of how to configure a block or brick for the mortarless construction of a wall. It in particular does not deal with the problem of how to inhibit water infiltration nor how to facilitate drainage of water from between adjacent blocks or bricks.

Also known in the art are U.S. Pat. No. 1,981,324 (Peterson), U.S. Pat. No. 2,141,035 (Daniels), U.S. Pat. No. 2,323,661 (Hosbein), U.S. Pat. No. 2,550,945 (Steinhage et al.), U.S. Pat. No. 2,622,864 (Hasche), U.S. Pat. No. 2,823,027 (Coberly), U.S. Pat. No. 3,221,614 (Pertien), U.S. Pat. No. 3,870,423 (Peitz, Jr.), U.S. Pat. No. 4,441,298 (Limousin), U.S. Pat. No. 4,936,712 (Glickman), U.S. Pat. No. 5,205,675 (Hamel), U.S. Pat. No. 5,279,082 (Scholta) and U.S. Pat. No. 5,337,527 (Wagenaar), which disclose various types of blocks and wall or pavement structures. However, none of these blocks and wall structures seem to be completely satisfactory in all aspects involved in the fast and steady construction of mortarless walls of buildings.

It would be advantageous to have a block for mortarless construction of a wail which is relatively simple in design and inexpensive to manufacture.

It would be advantageous to have a block which may be used without mortar to construct a wall and which may attenuate or inhibit the penetration of water between adjacent like blocks, e.g. due to capillary action and/or the influence of wind. It would also be advantageous to have a block for the mortarless construction of a wall which may facilitate the drainage of water from between adjacent blocks.

It would be further advantageous to have blocks which are interlockable with like blocks so as to form a wall without the need for using mortar.

It would also be advantageous to have blocks which are able to attenuate deformations in the construction thereof.

It would also be advantageous to be able to provide a mortarless wall which is steady and easy to construct.

It is to be understood herein that the word "mortar" refers to any binding agent of any kind whatsoever including but not limited to a binding agent based on cement, lime and sand, an adhesive, etc., Thus, the word "mortarless" is to be understood as characterising a wall wherein the blocks are not held together by a binding agent.

The present invention in one general aspect relates to a tongue and mortise block, for use in the construction of a wall wherein a plurality of like tongue and mortise blocks are stacked in successive mortarless overlapping courses so as to define a wall face, said tongue and mortise block comprising
two side ends spaced apart by
a top face
a bottom face
a front face and
a rear face
said top face comprising a tongue interlock element and a declining face portion, said declining face portion connecting the tongue interlock element to the front face, said bottom face comprising a mortise interlock element and a forward face portion, said forward face portion connecting the mortise interlock element to the front face,
said two side ends, said top face, said bottom face, said front face and said rear face being configured such that, when said tongue and mortise block and an underlying, like, block form part of the wall and the bottom face of the tongue and mortise block engages the top face of the underlying, like, block such that the front face of the tongue and mortise block defines a portion of the wall face,
the tongue interlock element of the underlying, like block registers in the mortise interlock element of the block so as to interlock both blocks such that relative forward and rearward displacement is inhibited, and
the front face of the tongue and mortise block is vertically offset downwardly relative to the tongue element and the rear face thereof.

The present invention also relates to a tongue and mortise block, for use in the construction of a wall wherein
a plurality of like tongue and mortise blocks are stacked in successive Mortarless overlapping courses so as to define a wall face,
said tongue and mortise block comprising
two side ends spaced apart by
a top face
a bottom face
a front face and
a rear face
said top face comprising a tongue interlock element and a declining face portion, said declining face portion comprising a ledge element and a top intermediate element, said top intermediate element connecting the tongue interlock element to the ledge element, said ledge element connecting the top intermediate element to the front face, said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate face element to the front face, said two side ends, said top face, said bottom faces said front face and said rear face being configured such that, when a tongue and mortise block and an underlying, like, block form part of the wall and the bottom face of the tongue and mortise block engages the top face of the underlying, like, block such that the front face of the tongue and mortise block defines a portion of the wall face, the tongue interlock element of the underlying block registers in the mortise interlock element of the tongue and mortise block so as to interlock both blocks such that relative forward and rearward displacement is inhibited, the front face of the tongue and mortise block is vertically offset downwardly relative to the tongue element thereof, the foot element of the forward face portion of the tongue and mortise block engages the ledge element of the underlying, like, block The present invention further provides a tongue and mortise block, for use in the construction of a wall wherein a plurality of like tongue and mortise blocks are stacked in successive mortarless overlapping courses so as to define a wall face, said tongue and mortise block comprising
two side ends spaced apart by
a top face
a bottom face
a front face and
a rear face said top face comprising a tongue interlock element and a declining drainage face portion, said drainage face portion connecting the tongue interlock element to the front face, said bottom face comprising a mortise interlock element and a forward face portion, said forward face portion connecting the mortise interlock element to the front face, said two side ends, said top face, said bottom face, said front face and said rear face being configured such that, when a tongue and mortise block and an underlying, like, block form part of the wall and the bottom face of the tongue and mortise block engages the top face of the underlying, like, block such that the front face of the block defines a portion of the wall face, the tongue interlock element of the underlying like, block registers in the mortise interlock element of the tongue and mortise block so as to interlock both blocks such that relative forward and rearward displacement is inhibited, the front face of the tongue and mortise block is vertically offset downwardly relative to the tongue element and the rear face thereof, and the forward face portion of the bottom face of the tongue and mortise block and the drainage face portion of the top face of the underlying, like, block are spaced apart and define side walls of a drainage air gap therebetween.

The present invention in particular provides a tongue and mortise block, for use in the construction of a wall wherein a plurality of like tongue and mortise blocks are stacked in successive mortarless overlapping courses so as to define a wall face, said block comprising
two side ends spaced apart by
a top face
a bottom face
a front face and
a rear face said top face comprising a tongue interlock element and a declining drainage face portion, said declining drainage face portion comprising a ledge element and a top intermediate face element, said top intermediate face element connecting the tongue interlock element to the ledge element, said ledge element connecting the top intermediate face element to the front face, said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate face element to the front face, said two side ends, said top face, said bottom face, said front face and said rear face being configured such that, when a tongue and mortise block and an underlying, like, block form part of the wall and the bottom face of the tongue and mortise block engages the top face of the underlying, like, block such that the front face of the tongue and mortise block defines a portion of the wall face, the tongue interlock element of the underlying block registers in the mortise interlock element of the tongue and mortise block so as to interlock both blocks such that relative forward and rearward displacement is inhibited, the front face of the tongue and mortise block is vertically offset downwardly relative to the tongue element thereof, the foot element of the forward face portion of the block engages the ledge element of a said underlying, like, block, and the bottom intermediate face element of the tongue and mortise block and the top intermediate face element of the underlying, like, block are spaced apart and able to define side walls of a drainage air gap therebetween.

The opposite lateral side ends of a block may take on any desired shape or form. They may for example be shaped to mate or engage the lateral sides of adjacent like bricks on either side thereof to form a joint of desired shape e.g. flat curved sloped etc. If desired blocks may be placed in block courses so as not to laterally abut.

A block in accordance with the present invention may take on any desired aspect. A block may for example take on the aspect of a brick, a wall tile, etc.; it may of course take on a more massive aspect as desired. A block may be formed of any suitable material such as for example of concrete, clay, resin or plastic material, or any other mouldable material.

In accordance with the present invention the reference to the expression "declining drainage face portion" is to be understood as referring to a face able to avoid water retention and over which water may freely pass downwardly, i.e. the face is at least substantially free of depressions, holes and the like which trap water. The drainage face portion even if comprising a number of elements is thus nevertheless configured to have an overall slope such that when a block is placed in a wall, water is able to flow down the drainage face without being trapped or retained thereby.

It is also to be understood, in accordance with the present invention that the reference to "a drainage air gap" is a reference to a gap, chamber, aperture, hole, slit and the like which is sized and configured for attenuating the infiltration of water between the block and a said underlying, like, block and/or for facilitating the drainage of water from therebetween down the drainage face mentioned above.

The tongue and mortise elements of a block may take on any desired or necessary configuration. It is, however, to be kept in mind that these elements are to respectively cooperate with the mortise and tongue elements of like upper or underlying block(s) as the case may be such that when such blocks are stacked together the complementary tongue and mortise elements thereof define a nesting pair of interlocked elements able to inhibit displacement of the blocks relative to each other by forces acting for example perpendicularly to the front face. The tongue and/or mortise elements may for example be disposed so as to be spaced apart from the side ends of the block, so as to be disposed adjacent one side end or so as to extend from one side end to the other side end; again it is to be borne in mind that the tongue and mortise elements of like blocks are to be configured so as to be able to interlock the blocks as described herein. The top face may have a tongue element formed with convex end part and having a dihedral angle; the bottom face of the block may be formed with a complementary concave recesses also having a dihedral angle.

The tongue and mortise elements of a block may for example both be disposed adjacent the rear face thereof and each may longitudinally extend from one side end of the block to the other side end thereof. On the other hand, these interlock elements may be disposed at some other position intermediate the rear and front faces if so desired; in this case however, it must be kept in mind that the top and bottom faces must be appropriately configured to facilitate the desired interlocking of like blocks.

Although like blocks are to be interlockable as mentioned above, a block in accordance with the present invention may nevertheless be provided with a mortise element which is sized and configured relative to the tongue element thereof so as to permit limited adjustment (i.e. positional adjustment) of the block perpendicularly to the wall face when the block is initially disposed on a said underlying, like, block, i.e. by allowing for a minor amount of clearance or play between the tongue and mortise nested therein, the play being rotational or linear about the tongue element.

A block may for example have a rear face which comprises an upper rear face element and a lower remaining rear face element. The upper rear face element is disposed adjacent the top face of the block and comprises a projection for engaging a support means disposed opposite the rear face of the block. The lower remaining rear face element is forwardly inset relative to the projection of the upper rear face element. Such a configuration of the rear face may advantageously facilitate the above mentioned limited adjustment.

As mentioned above, a block in accordance with the present invention may have a top face provided with a declining drainage face portion. The drainage face portion is configured to have an overall slope such that when the block is place in a wall, water is able to flow down the drainage face without being trapped thereby. Thus in accordance with the present invention a block is provided wherein said ledge element and said top intermediate face element may be disposed such that the ledge element and the top intermediate element define an obtuse angle therebetween and when said block and a said underlying, like, block form part of the wall and the bottom face of the block engages the top face of a said underlying, like, block, the ledge element may be able to be disposed such that the wall face and the ledge element define an acute angle therebetween and the top intermediate face element may be able to be disposed such that the wall face and the top intermediate face element define an acute angle therebetween.

A block in accordance with the present invention may, if desired, include means for allowing the attachment of the block to a support means disposed opposite the rear face thereof (e.g. to a furring). The means for allowing attachment of the block may comprise an aperture extending from said top intermediate face element to the rear face of the block. Such an aperture may be countersunk at the top intermediate side thereof. The aperture may thus be a straight opening for receiving an attachment means such as a nail or screw element for fixing the block to a support means such as a wall furring.

The means for allowing attachment of a block to a support means may alternatively comprise a guide groove for facilitating the drilling of an aperture through the block from the top intermediate face element to the rear face of the block, said guide groove being disposed in the top intermediate face element and extending from one side end of the block to the other side end thereof.

As mentioned above a block may be configured to cooperate with a like underlying block so as to form a drainage air gap. The drainage air gap may take on any desired form or shape keeping in mind that its purpose is to attenuate the infiltration of water between the block and a said underlying, like, block as well as to facilitate the drainage of water from therebetween (i.e due to the sloped drainage face); the infiltration of water may, for example, be due to capillary action and/or the influence of wind acting on the wall face during a rain storm for example. Thus a block may be provided wherein the top and bottom intermediate face elements of the block may be configured such that, when said block and a said underlying, like, block form part of the wall and the bottom face of the block engages the top face of a said underlying, like, block, the bottom intermediate face element of the block and the top intermediate face element of a said underlying, like, block are able to define side walls of a drainage air gap of wedge-like shape. The wedge shaped gap may have a wide part and a lower narrow end, said wide part being disposed toward the interlocked tongue and mortise elements, said lower narrow end being disposed toward the engaging foot and ledge elements.

The above blocks may be incorporated into a wall. The wall may for example be an exterior wall which is exposed to the atmosphere, e.g. rain and wind. The wall may if desired be an interior wall.

Thus the present invention in a further aspect provides a wall wherein a plurality of like blocks are stacked in successive mortarless overlapping courses so as to define a wall face,
  each said block comprising
    two side ends spaced apart by
      a top face
      a bottom face
      a front face and
      a rear face
    said top face comprising a tongue interlock element and
      a declining face portion, said declining face portion connecting the tongue interlock element to the front face, said bottom face comprising a mortise interlock element and a forward face portion, said forward face portion connecting the mortise interlock element to the front face, said two side ends, said top face, said bottom face, said front face and said rear face being configured such that, when said block and an underlying, like, block form part of the wall and the bottom face of the block engages the top face of a said underlying, like, block such that the front face of the block defines a portion of the wall face, the tongue interlock element of a said underlying block is able to register in the mortise interlock element of the block so as to be able to interlock both blocks such that relative forward and rearward displacement is inhibited, and the front face of the block is vertically offset downwardly relative to the tongue element thereof, and wherein at least some of said blocks include means for allowing the attachment of such block to a support means disposed opposite the rear face thereof and at least some of such blocks provided with means for the attachment thereof to said support means are attached to said support means by respective attachment means exploiting respective means for allowing attachment of the block to the support mean.

The present invention also provides a wall wherein a plurality of like blocks are stacked in successive mortarless overlapping courses so as to define a wall face, each said block comprising
two side ends spaced apart by
a top face
a bottom face
a front face and
a rear face said top face comprising a tongue interlock element and a declining face portion, said declining face portion comprising a ledge element and a top intermediate element, said top intermediate element connecting the tongue interlock element to the ledge element, said ledge element connecting the top intermediate element to the front face, said bottom face comprising a mortise interlock element and a forward face portion, said forward face portion comprising a foot element and a bottom intermediate element, said bottom intermediate element connecting the mortise interlock element to the foot element, said foot element connecting the bottom intermediate element to the front face, said two side ends, said top face, said bottom face, said front face and said rear face being configured such that, when said block and an underlying, like, block form part of the wall and the bottom face of the block engages the top face of a said underlying, like, block such that the front face of the block defines a portion of the wall face, the tongue interlock element of a said underlying block is able to register in the mortise interlock element of the block so as to be able to interlock both blocks such that relative forward and rearward displacement is inhibited, the front face of the block is vertically offset downwardly relative to the tongue element thereof, the foot element of the forward face portion of the block is able to engage the ledge element of the underlying, like, block and wherein at least some of said blocks include means for allowing the attachment of such block to a support means disposed opposite the rear face thereof and at least some of such blocks provided with means for the attachment thereof to said support means are attached to said support means by respective attachment means exploiting respective means for allowing attachment of the block to the support mean.

The present invention also in particular provides a wall wherein a plurality of like blocks are stacked in successive mortarless overlapping courses so as to define a wall face thereof, each said block comprising
two side ends spaced apart by
a top face
a bottom face
a front face and
a rear face said top face comprising a tongue interlock element and a declining drainage face portion, said declining drainage face portion comprising a ledge element and a top intermediate element, said top intermediate element connecting the tongue interlock element to the ledge clement, said ledge element connecting the top intermediate element to the front face, said bottom face comprising a mortise interlock element and a forward face portion, said forward face portion comprising a foot element and a bottom intermediate element, said bottom intermediate element connecting the mortise interlock element to the foot element, said foot element connecting the bottom intermediate element to the front face, said two side ends, said top face, said bottom face, said front face and said rear face being configured such that, when said block and an underlying, like, block form part of the wall and the bottom face of the block engages the top face of a said underlying, like, block such that the front face of the block defines a portion of the wall face, the tongue interlock element of a said underlying block is able register in the mortise interlock element of the block so as to be able to interlock both blocks such that relative forward and rearward displacement is inhibited, the front face of the block is vertically offset downwardly relative to the tongue element thereof, the foot element of the forward face portion of the block is able to engage the ledge element of a said underlying, like, block, and the bottom intermediate element of the block and the top intermediate element of a said underlying, like, block are spaced apart and able to define side walls of a drainage air gap therebetween, and wherein at least some of said blocks include means for allowing the attachment of such blocks to a support means disposed opposite the rear face thereof and at least some of such blocks provided with means for allowing attachment thereof to said support means are attached to said support means by respective attachment means exploiting respective means for allowing attachment of such blocks to the support means.

In accordance with the present invention a wall may comprise a plurality of bricks arranged in self-supporting, successive overlapping courses, i.e. the blocks may be arranged side by side in rows or layers so as to engage each other in shingle like fashion.

A support means may comprise a wall furring means which may comprise a rear surface affixable against the outer surface of a building wall structure, and a front surface for receiving the rear faces of the blocks as herein described. A wall furring means may for example be a flat panel of wood affixed (e.g. affixed to an underlying wall support structure). Alternatively, said wall furring means may be a plurality of horizontally extending, vertically spaced rails or strips (of wood) to which at least some of the blocks of a wall may be affixed (by nails, screws, etc.,). The furring strips for example each having a front protruding surface, and the rear side of each of the blocks may have a longitudinal recess shaped to fit with and receive the protruding surface of a corresponding one of the rails. The strips of wood serve to space the blocks away from the underlying support structure so as to provide an air gap between the back of the blocks and the underlying wall support structure.

A wall may further comprise base units to provide a steady bottom course, each of the base units having a bearing surface adapted to steadily rest onto an accommodating structural member having a planar surface. The base units may have a top face provided with convex dihedral protrusions shaped to nest in a complementary mortise element. The base units may also have a pair of opposite lateral sides shaped to match lateral sides of the adjacent base units to form said bottom course.

The tongue element may comprise an inset seat portion for allowing attachment of the block to the support structure, the seat element being configured to engage a chevron-shaped bracket affixable to a rear support means. The rear face of the block may for example be provided with a longitudinal recess extending between the side ends thereof, the longitudinal recess being configured and sized to engage a lining rail affixed to the support means.

In accordance with a wall of the present invention adjacent blocks of each course of blocks may define a joint therebetween. The blocks may if desired be stacked directly on top of one another so as to form a plurality of horizontal columns of blocks, the joints between columns being more or less parallel. Alternatively the joints between blocks may take on a horizontal zig-zag pattern; such a pattern will facilitate the inhibition of water infiltration.

Thus, in this latter case at least one course of blocks comprises blocks which engage a respective pair of adjacent underlying blocks in an underlying course of blocks and straddle the joint between said pair of adjacent underlying blocks. If desired, adjacent blocks of each course of blocks may define a joint therebetween and a respective block in an upper course of blocks straddles each such joint and engages the underlying adjacent blocks defining said respective joint. A straddling block may be disposed more over one block than another or block than another or it may be disposed in equal fashion over the joint of the underlying pair of blocks, i.e. the blocks may be stacked in staggered fashion.

In drawings which illustrate example embodiments of the invention,

FIG. 3 is a side end view of a parent block comprising a pair of blocks as shown in FIG. 1 joined at the front faces thereof;

FIG. 4 shows the separated pair of blocks obtained from the parent block of FIG. 1 in interlocking relationship;

FIG. 8 shows an enlarged view of the interlocked blocks of FIG. 4;

FIG. 9 is an enlarged view of the interlocked tongue and mortise elements;

FIG. 10 is an enlarged view of the guide groove;

FIG. 11 is an enlarged view of the engaging foot and ledge elements;

FIG. 12 illustrates a block in a straddling relationship with underlying blocks;

FIG. 13 is an illustration of a plurality of blocks in a staggered relationship;

FIG. 14 illustrates a number of like blocks defining example embodiments of different drainage air gaps therebetween;

FIG. 15 illustrates a number of like blocks defining additional example embodiments of different drainage air gaps therebetween;

FIG. 16 is a side end view of a further embodiment of a parent block comprising another pair of example blocks joined at the front faces thereof;

FIG. 17 shows the separated pair of blocks obtained from the parent block of FIG. 16 in interlocking relationship;

FIG. 18 shows a perspective view of an example embodiment of a modified version of the block shown in FIG. 1 wherein the guide groove has been replaced by tow apertures passing from the top intermediate face element thereof to the rear face thereof;

FIG. 19 shows a perspective view of a further example embodiment of a block in accordance with the present invention provided with a inset seat for engaging a bracket for attaching the block to a Tear support means;

FIG. 23 shows a perspective view of a further embodiment of a block provided with a side end slot for attachment to a building structure using a nail, screw or the like;

Figure 1:
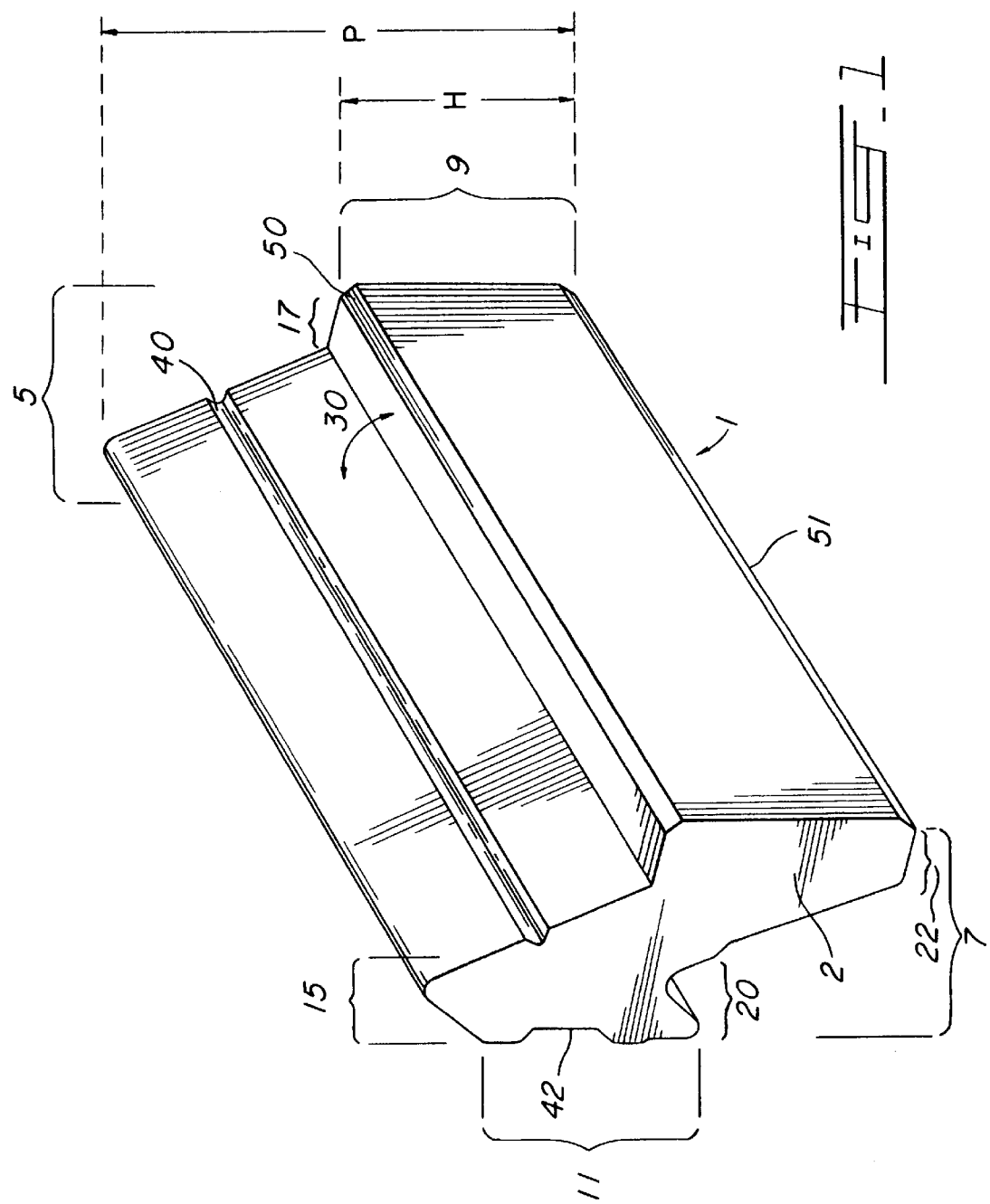
FIG. 1 shows a perspective view of an example embodiment of a block in accordance with the present invention, the block being provided with a longitudinal guide groove interrupting the top intermediate face element thereof.
Figure 23:
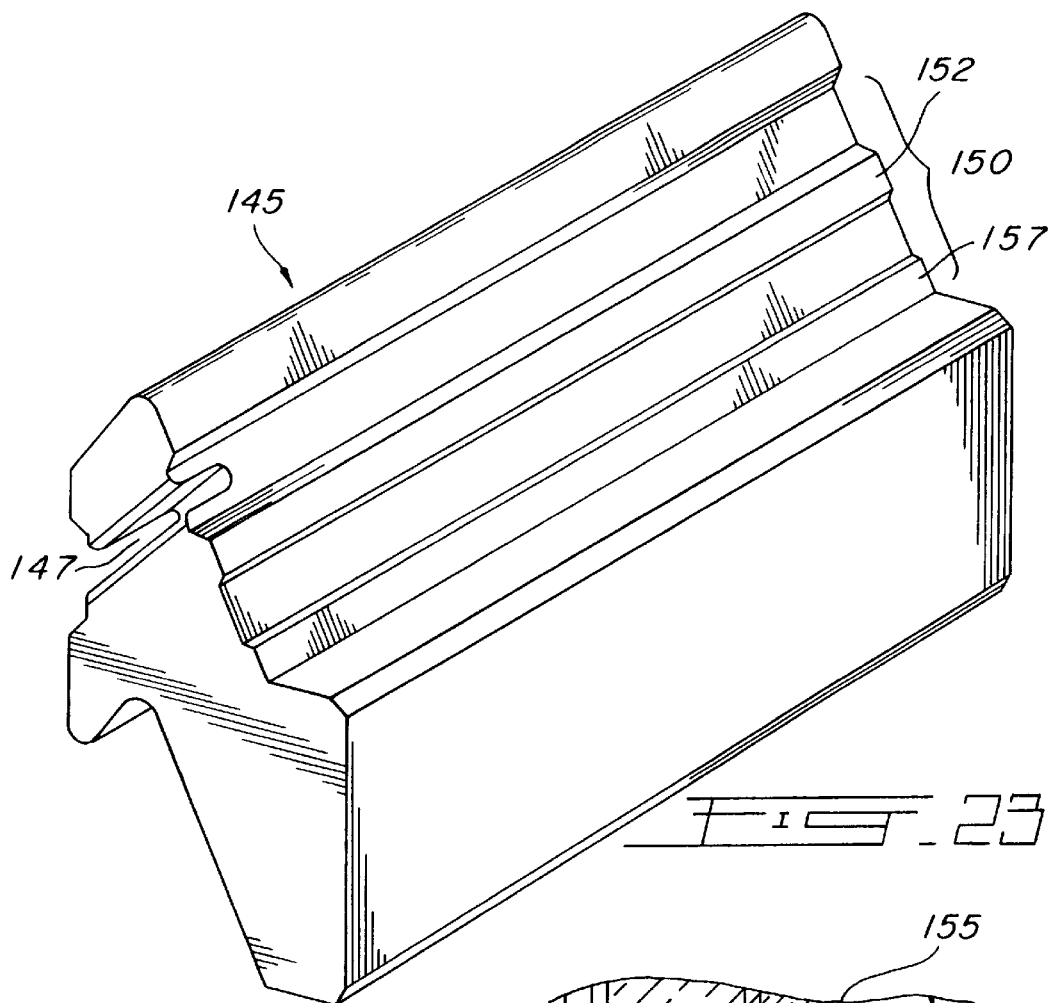
Figure 25:
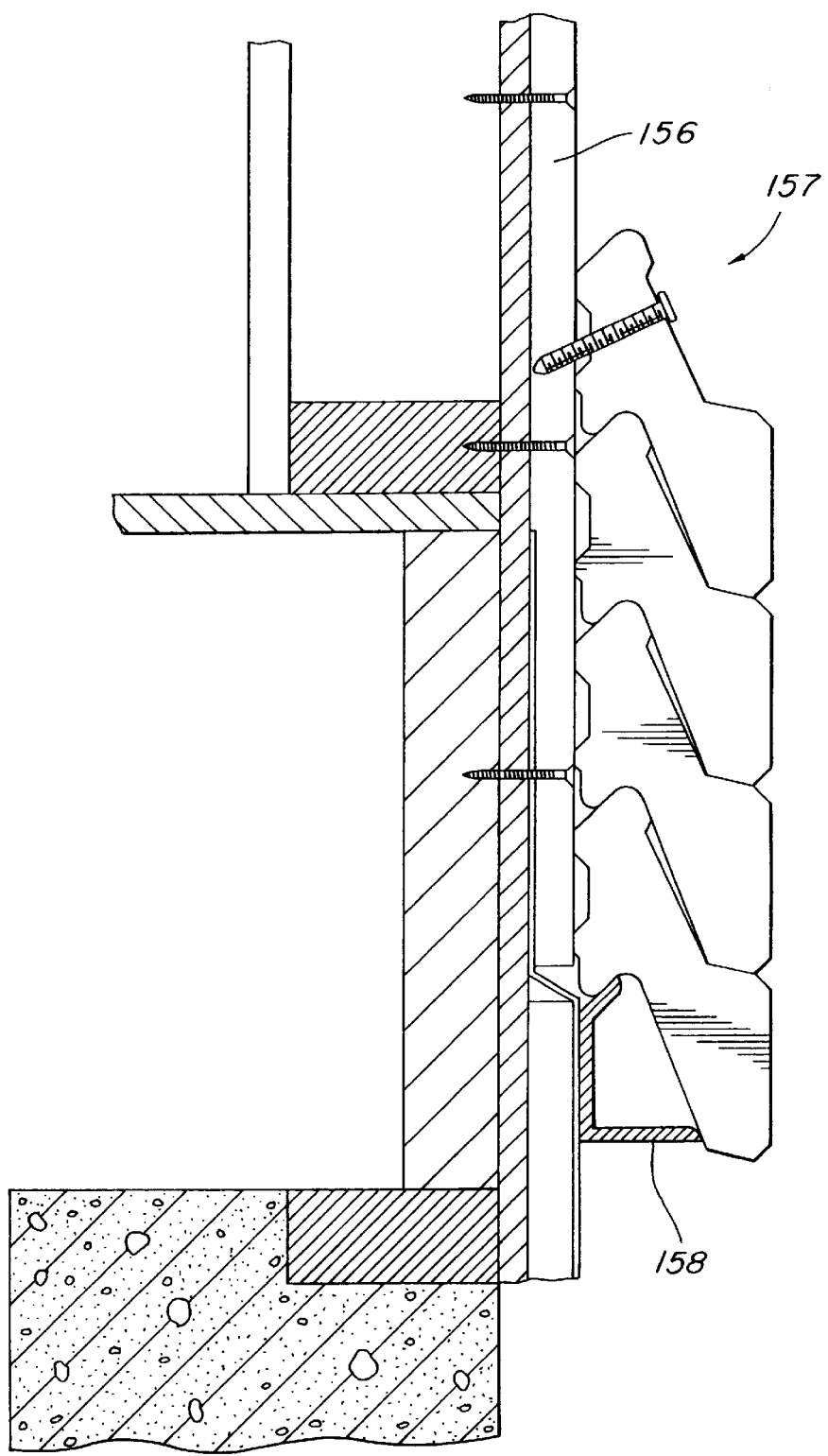
Figure 33:
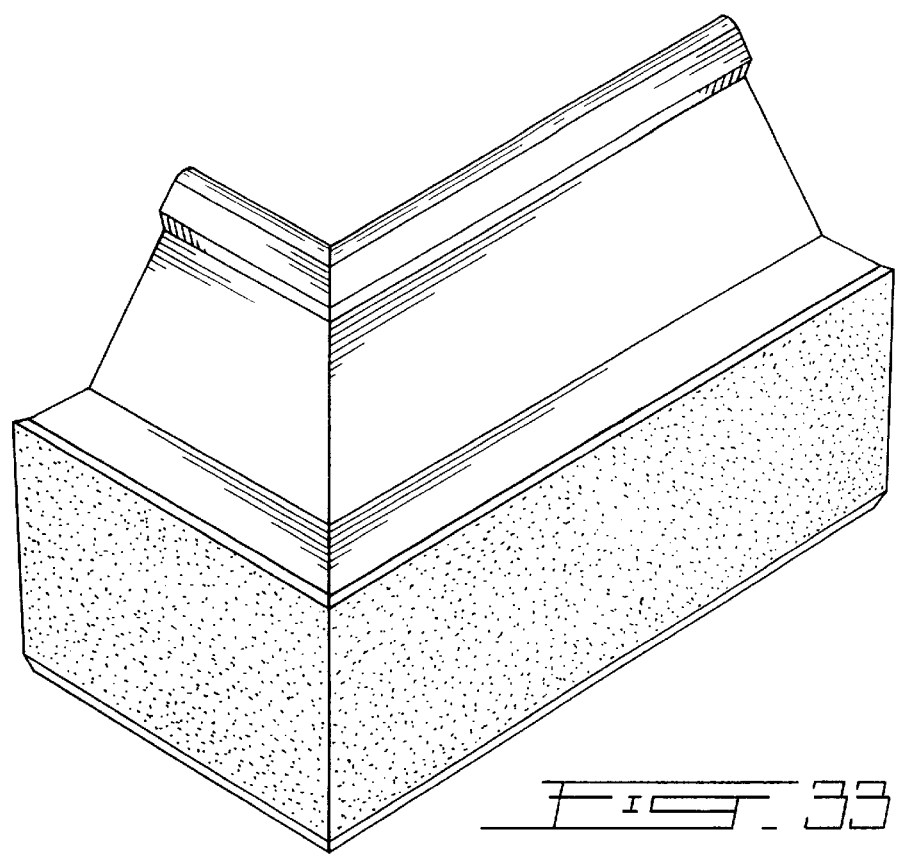
Figure 34:
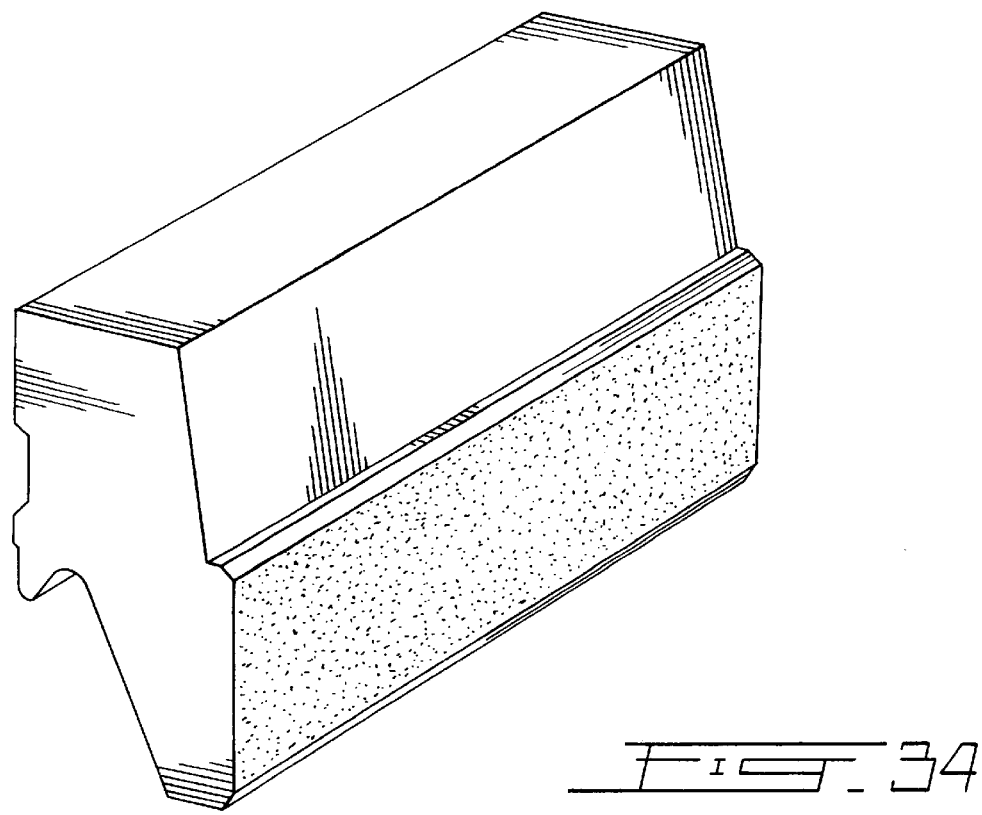
Figure 35:
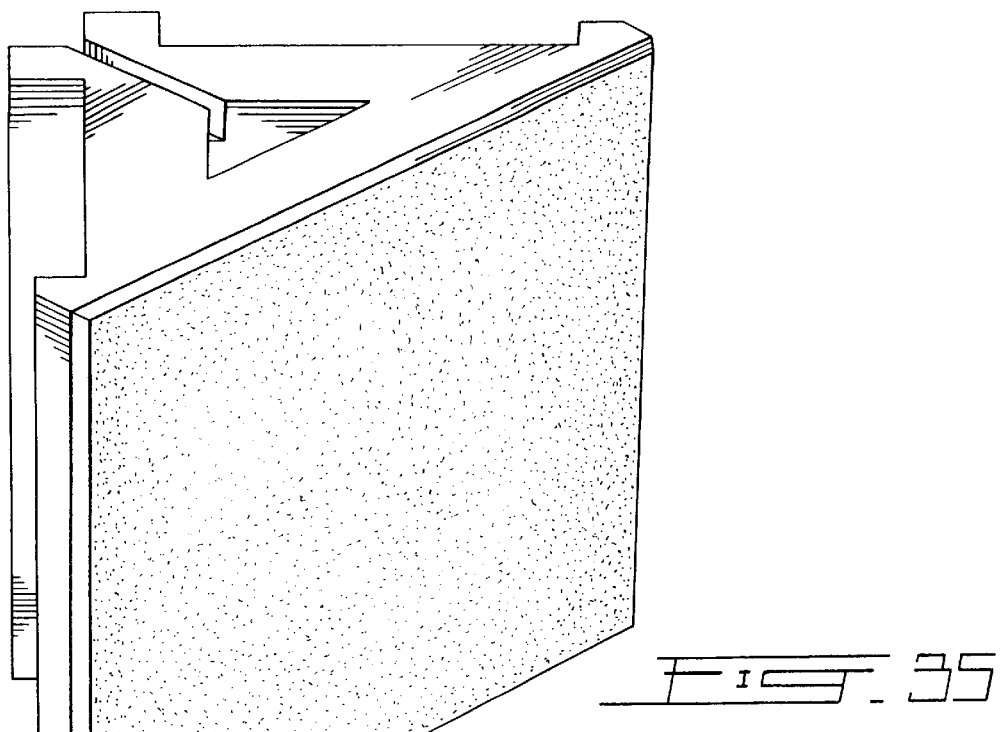

FIG. 25 shows a side elevation view of a further example mortarless wall portion constructed using blocks as seen in FIG. 1 attached to a furring member, FIG. 26 shows a side elevation view of another example mortarless wall portion constructed using blocks having a side configuration of the block of FIG. 19 but wherein the inset seat has been replaced with apertures such as shown with respect to the block in FIG. 18;

FIG. 27 shows a side elevation view of an additional example mortarless wall portion constructed using blocks as seen in FIG. 19 attached to a furring member;

FIG. 28 shows a side elevation view of another example mortarless wall portion constructed using blocks as seen in FIG. 23 attached to a furring member as seen in FIG. 26;

FIG. 29 shows a side elevation view of another example mortarless wall portion constructed using a further example embodiment of blocks attached to a furring member as seen in FIG. 26;

FIG. 30 shows a side elevation view of another example mortarless wall portion constructed using another example embodiment of blocks attached to a furring member as seen in FIG. 26;

FIG. 31 shows a side elevation view of yet another example mortarless wall portion constructed using yet another example embodiment of blocks attached to a furring member as seen in FIG. 26;

FIG. 32 illustrates a partial front view of staggered blocks only some of which are attached to furring elements;

FIG. 33 shows a perspective view of a corner brick for use in a masonry wall according to the present invention;

FIG. 34 shows a perspective view of a finishing brick for use in a masonry wall according to the present invention;

FIG. 35 shows a perspective view of another corner brick for use in a masonry wall according to the present invention.

Figure 36:
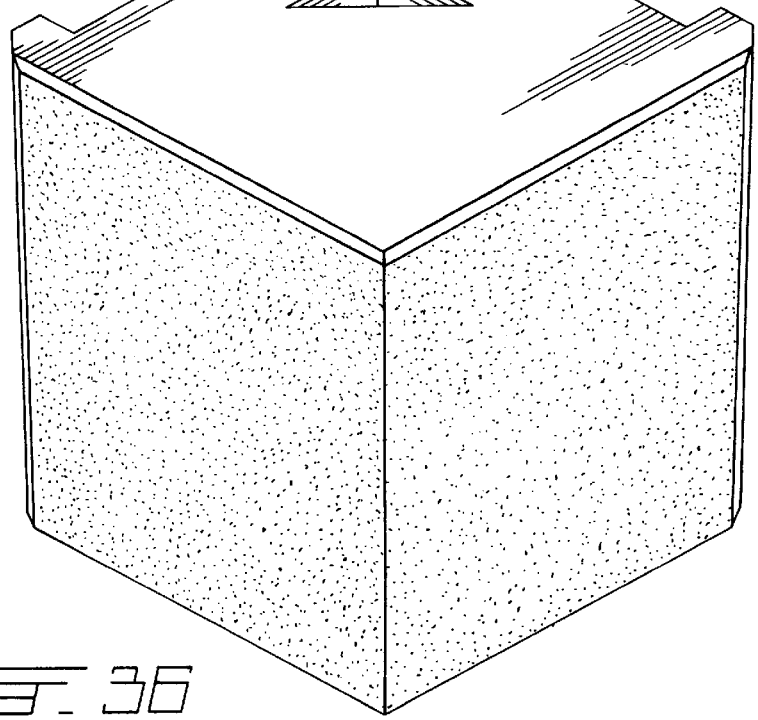

FIG. 36 shows a perspective view of another corner brick for use in a masonry wall according to the present invention.

Figure 2:
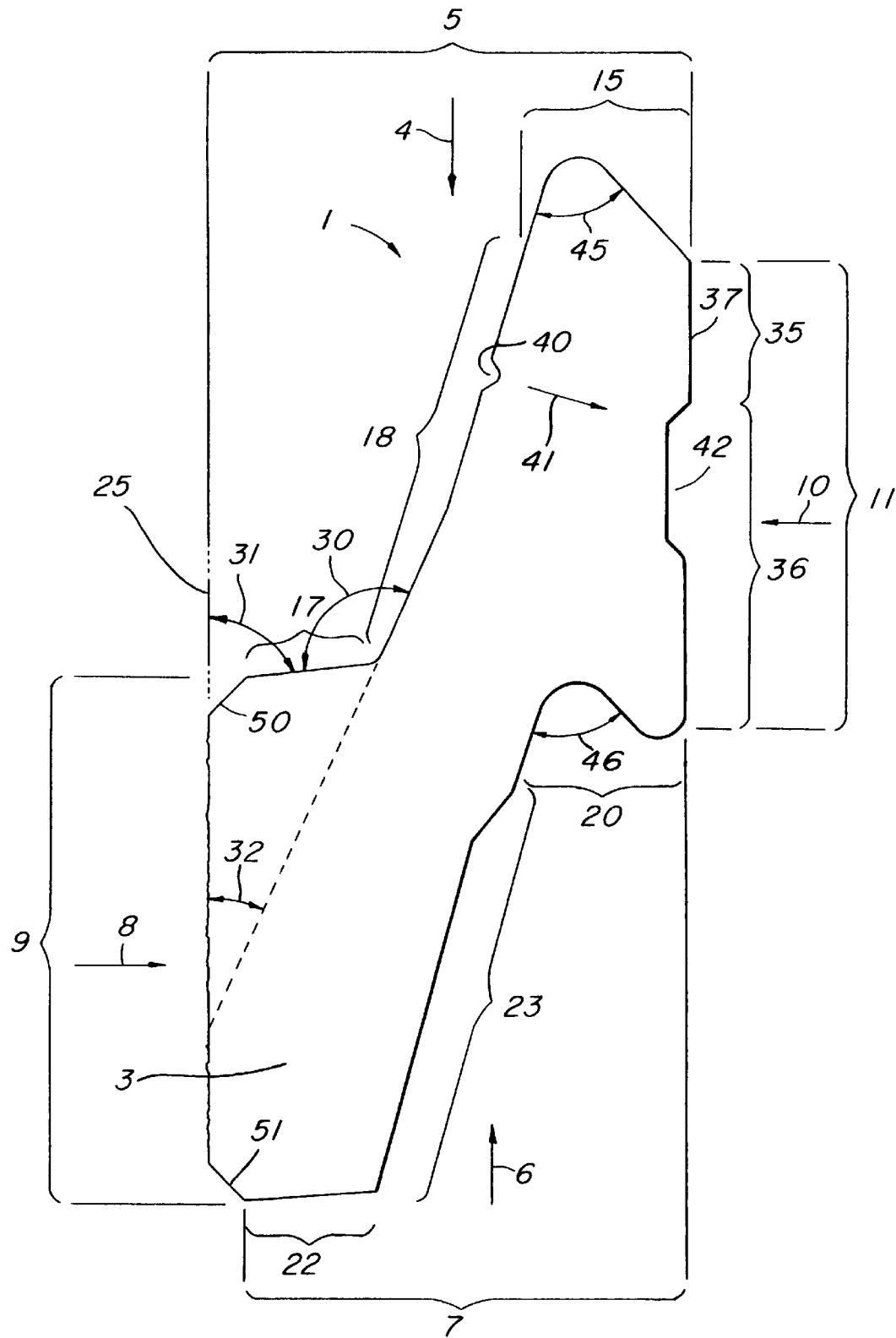
FIG. 2 is a side end view of the block shown in FIG. 1.

Referring to FIGS. 1 and 2 these figures illustrate an example embodiment of a block in accordance with the present invention. The block 1 has two side ends 2 and 3. The block 1 has, when viewed in the direction of the arrow 4, a top face designated by the reference numeral 5. The block 1 has, when viewed in the direction of the arrow 6, a bottom face designated by the reference numeral 7. The block 1 has, when viewed in the direction of the arrow 8, a front face designated by the reference numeral 9. Finally, the block 1 has, when viewed in the direction of the arrow 10, a rear face designated by the reference numeral 11. The side ends 2 and 3 are spaced apart by the top face 5, the bottom face 7, the front face 9 and the rear face 11.

The top face 5 comprises a tongue interlock element 15 as well as a declining drainage face portion which comprises ledge element 17 and top intermediate face element 18.

The bottom face 7 comprises mortise interlock element 20 as well as a forward face portion which comprises foot element 22 and bottom intermediate face element 23.

A reference line 25 designates the plane, of the wall face of a wall in which the block 1 may be incorporated. As may be appreciated the front face 9 would define a portion of such wall face. As may be seen the ledge element 17 and the top intermediate face element 18 define an obtuse angle 30; on the other hand the ledge element 17 and the top intermediate face element 18 each define a respective acute angle 31 and 32 with the plane of the wall face. As shown the wall face would be more or less vertical straight up. The wall face if desired may however not be vertically straight up; in this case care would have to be taken to insure that the angles between the various elements of the declining face portion are such as to permit water to nevertheless run down the declining face portion to facilitate water drainage.

Figure 24:
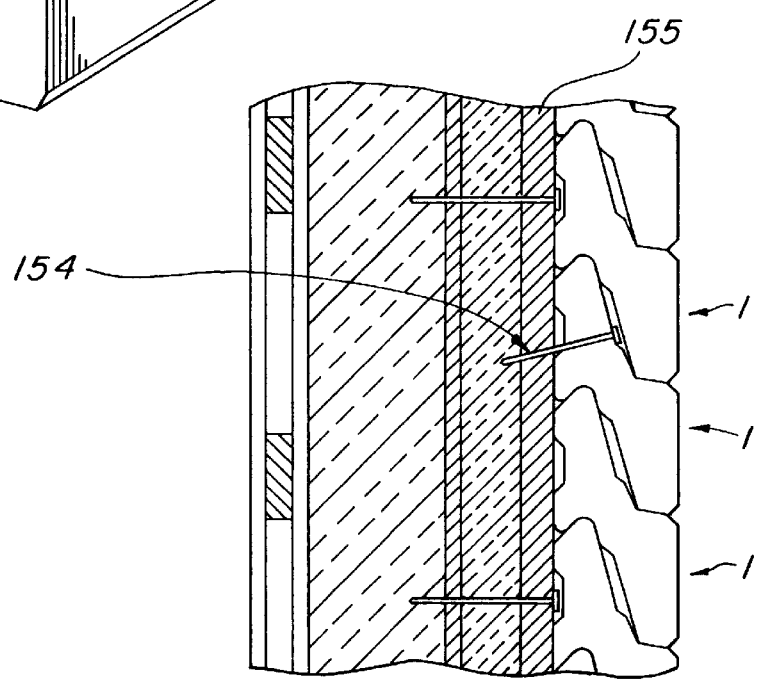
FIG. 24 shows a side elevation view of an example mortarless wall portion constructed using blocks as seen in FIG. 1 attached to a furring member.

The rear face 11 comprises an upper rear face element 35 and a lower remaining rear face element 36. The upper face element 35 comprises a projection 37 which vertically extends across the entire upper face element 35. If desired the projection 37 may vertically extend over a smaller part of the upper face element keeping in mind that the projection 37 is intended to abut a furring member as seen in FIGS. 24 and 25. The remaining rear face element 36 is forwardly inset in the direction of the arrow 10 as may be seen from FIG. 2.

The block 1 includes a guide groove 40 which extends from on side end to the other. The guide groove 40 is present to facilitate the drilling of apertures in the body of the block 11 in the direction of the arrow 41. These apertures may be used to secure the block to a rear support member such as a furring by means of a nail or screw.

As may be seen the tongue element 15 and the mortise element 20 are both disposed adjacent the rear face 11 and extend longitudinally from side end 2 to side end 3. The tongue element may if desired not extend form one side end to the other; e.g. a shortened tongue element may be bracketed between planar face portions level with the edge of the rear face. Alternatively, the mortise may not be an open ended groove as shown but may be closed off at its ends; in this case the tongue would of course have to be appropriately configured so as to be able to nest therein so as to interlock the blocks. The tongue element 15 includes a dihedral angle 45; the mortise element 20 includes a dihedral angle 46.

The rear projection 37 and the remaining rear face element 36 likewise extend from one side end to the other. The remaining rear face element 36 includes a groove 42 which may be exploited to fix the block to a support means in a manner analogous as shown for example in FIG. 26.

As may be seen from FIG. 2, the front face 9 is vertically offset downwardly relative to the tongue element 15, i.e. in this case the tongue element 15 is vertically higher than the front face 9.

The front face 9 has upper and lower bevelled edges 50 and 51, to look like a conventional block or brick. The block may have any suitable length, height and width. The dimensions of the block 1 depend on the available moulding process and the bearing capacity of the building foundation. A width, between the front and rear faces that is suitable for example for an outside wall of masonry construction, is approximately equal to 83 mm. Considering the block 1 having a total height P and a frontal height H, then for example $P \geq 1.2$ H and in particular $P=2$ H.

As mentioned above the block 1 may conveniently be formed by concrete, clay, resin, or any other mouldable material. Referring to FIG. 3, the block 1 may be obtained by breaking a parent block 60 along a cleavage line 61 defined by upper and lower cleavage grooves 62 and 63.

Referring to FIG. 4, this figure illustrates the two blocks 1, obtained from the parent block 60, in interlocking relationship such that relative forward movement or displacement in the direction of the arrow 10 and relative rearward movement in the direction of the arrow 8 is inhibited However it is to be noted that for the configuration of the block 1 if only the two blocks 1 are considered by themselves as shown there is no relative lateral interlocking; for a wall such lateral locking is achieved by fixing at least some of the blocks in place by attaching them to a rear support means.

As may be seen from FIG. 4, with one block 1 disposed over a like block 1, the bottom intermediate face element 23 of the upper block and the top intermediate face element 18 of the lower or underlying block define the side walls of a drainage air gap 66 disposed between the upper and lower blocks 1. The gap 66 has wide part 68 dispose toward the interlocked tongue and mortise elements; the gap 66 also has a lower part 69 disposed towards the engaging foot and ledge elements, The dimensions of the air gap 66 may vary keeping in mind its purpose, e.g. inhibit infiltration of water by capillarity behind the wall.

Figure 5:
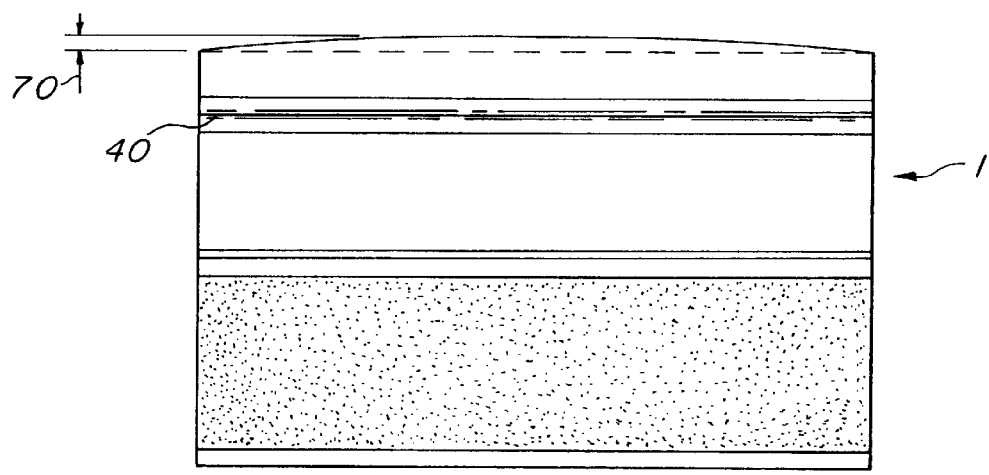
FIG. 5 shows a front view of a block as seen in FIG. 1 wherein the tongue element is shown with an example manufacturing deformation.
Figure 6:
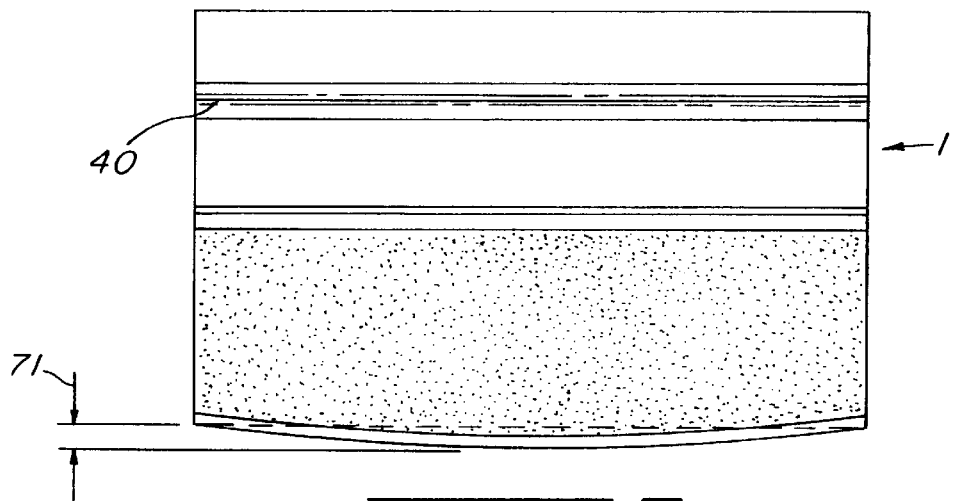
FIG. 6 shows a front view of a block as seen in FIG. 1 wherein the foot element is shown with an example manufacturing deformation.
Figure 7:
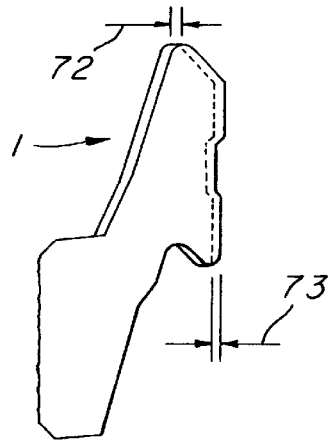
FIG. 7 shows a side end view of a block as seen in FIG. 1 wherein the tongue and mortise elements are shown with an example manufacturing deformation.

Referring to FIGS. 5, 6 and 7, these figures illustrate possible deformations of the block from the true or perfect shape thereof; the deviations are designated by the reference numerals 70, 71, 72 and 73.

Referring to FIG. 8, 9, 10, and 11 these figures show in more detail certain aspects of the interlocked the blocks 1. Although as mentioned above the blocks 1 are interlocked so as to inhibit movement thereof, certain of the block elements may be sized so as to provide a limited clearance so as to give the blocks some limited play for adjusting the relative dispositions of the blocks to attenuate the aforementioned deformities,i.e. for avoiding uneven stacking caused by small deformations due to manufacturing thereof. The possible clearances are designated by the reference numerals 75, 76 and 78 in FIGS. 9 and 11; the clearance may thus allow for some minor linear movement in the direction of the arrow 80 and/or some minor rotational movement in the direction of the arrow 81 i.e. rotation for example about point 82. AS may be seen from FIG. 11 the foot element does not engage the underlying ledge element over its entire face, i.e. at the front part there is a clearance 85. Also as may be seen from FIG. 9 the lower remaining rear face element of the rear face is inset forwardly relative to the projection 37 an amount indicated generally by the reference numeral 88.

FIGS. 12 and 13 generally illustrate how courses of blocks such as block 1 may be stacked in staggered fashion; as seen in FIG. 12 the central block 89 is disposed equally on both sides of the joint 90. It is to be understood, however that the benefit of the zig-zag joints may also be obtained if the block 89 is displaced to one side such that it is no longer disposed equally about the joint 90, i.e. as long as the joint 90 is covered water infiltration along the vertical joints may be advantageously inhibited relative to the case where the vertical joints extend vertically in a straight line between columns of blocks.

Referring to FIGS. 8 and 12 an upper block 1 may bear on the underlying block 1 at both the tongue element and the ledge element or if desired, provided that adequate interlocking is achieved, substantial only on the ledge element.

In accordance with the present invention the expression "like blocks" include blocks which while not exactly identical are nevertheless able to interlock as described herein and as the case may be have top and bottom intermediate face elements which are able to define a discharge gap therebetween. Referring to FIGS. 14 and 15 the figures show blocks 1 being interlocked with like blocks 95, 96, 97 and 98 and 99. The like blocks 95, 96 98 and 99 have projections on the intermediate faces elements thereof which may be considered to divide the respective air gap into a number of communicating decompression chambers for accentuating the attenuation of water infiltration due for example ti wind action in the presence of rain. These projection all have sloping upper surfaces 102, 103, 104, 105, 106 and 107 such that the projection don't trap water.

Although the air gap has been shown in the drawing to be of more or less wedge-like shape the air gap may take on any other desired shape provided that it is still a drainage air gap.

Turning to FIGS. 16 and 17, these figures show an additional alternate block configuration and a consequential different air gap configuration; the air gap being designated by the reference numeral 110. The parent block 112 is cleavable in the same manner as the parent block 60 along a cleavage line 115 to form two blocks 117. The blocks 117 are of the same configuration as block 1 except for the configuration of the bottom intermediate face element 120.

FIG. 18 also shows an alternate block configuration. The block 122 is the same as block 1 except that block 122 does not have the guide groove 40. In place of the guide groove 40 the block 122 has two,apertures 127 and 128 which extend from the top intermediate face element to the rear face 11. The apertures may be countersunk to seat the head of a screw for example as indicated by the dotted circle 129.

Referring to FIG. 19, a further example embodiment of a block is illustrated. The block 130 is the same as the block 1 except for number of features, the block 130 does not have a guide groove 40; instead the block 130 is provided with an inset seat 133 for engaging a bracket for fixing the block to a rear support means. Additionally the top intermediate face element 135 is recessed relative to the top intermediate faced element 18 of block 1. Finally the bottom intermediate face element 136 is not recessed as is the case for the bottom intermediate face element 23. Referring to FIG. 26 the like blocks 130 are able to define air gaps 138 of wedge like shape.

Figure 22:
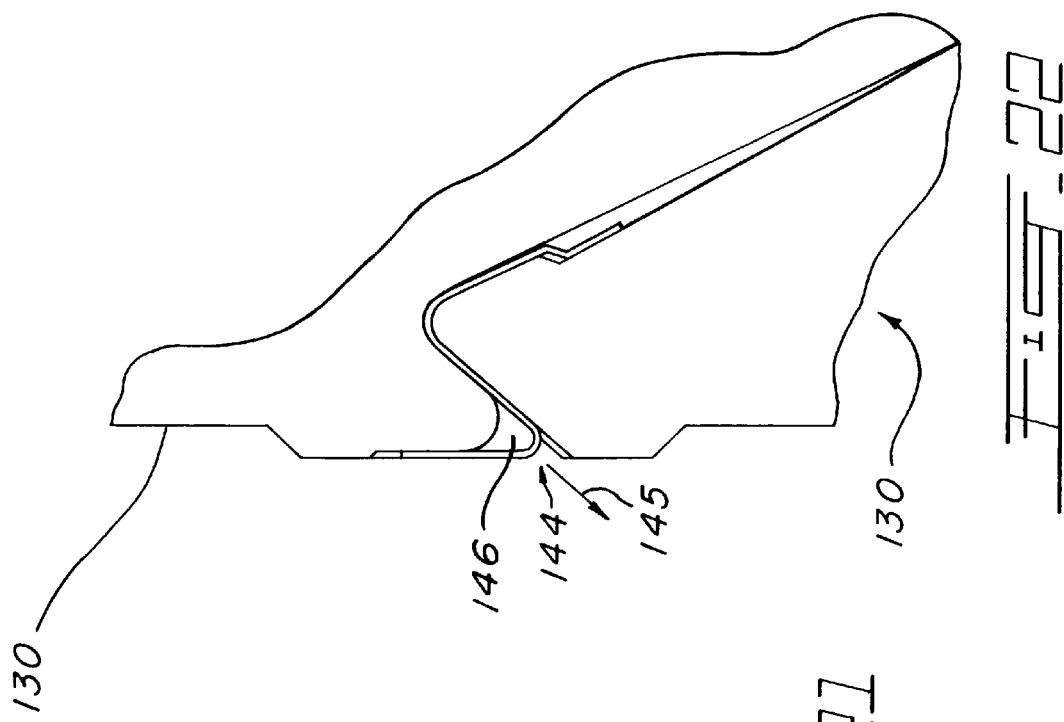
FIG. 22 is a partial side view of a bracket of FIG. 20 shown in place between two blocks of FIG. 19.
Figure 21:
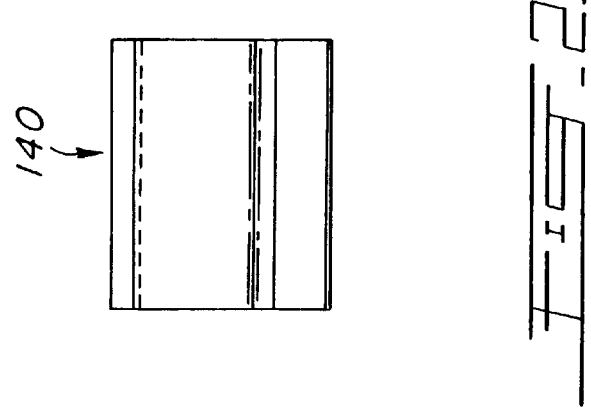
FIG. 21 is a front view of the bracket of FIG. 20.
Figure 20:
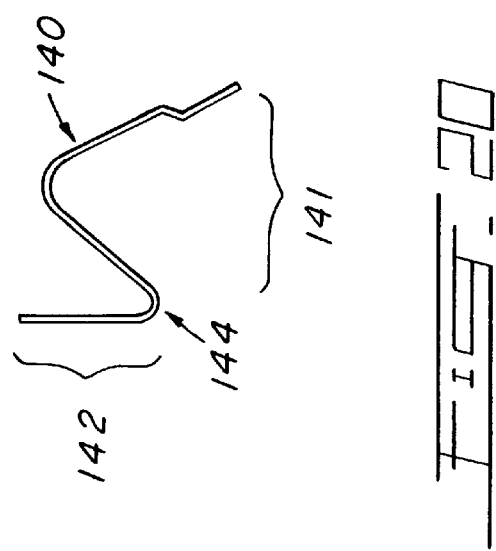
FIG. 20 is a side view of an example embodiment of a bracket for attaching the block of FIG. 19 to a rear support means.

Referring to FIGS. 20, 21 and 22 these figures illustrate an example bracket 140 having a portion 141 configured for engaging the inset seat 133 of block 130 The bracket also has a portion 142 for engaging a fastener such as a screw for attaching the bracket for example to a wall furring means. The portion 142 is provided with an opening indicated by the reference numeral 144 for receiving a screw (not shown) in the direction of the arrow 145; the space 146 is sized relative to the screw head such that the screw head does not engage the upper block 130.

Referring to FIG. 23, there is shown a modified embodiment of the block 130 shown in FIG. 19. The block 145 instead of having the inset seat 133 has slot groove 147 for receiving a nail or screw for example, the top intermediate face element 150 is provided with projection elements 152 and 153.

Referring to FIG. 24 this figure shows a portion of mortarless wall structure using the block 1. A screw 154 is used to attach one block 1 to a horizontal wall furring element 155.

Referring to FIG. 25, this figure show a portion of another mortarless wall structure wherein one of the blocks is also attached to a wall furring 156 by a screw 157. The block are supported by a base member 158 which is configured to supportingly engage the first row of blocks; the base member 158 is maintained in place by screws (not shown).

Referring to FIG. 26, there is shown a portion of a mortarless wall structure The structure includes a wall furring means comprising a plurality of horizontally extending, vertically spaced rails 160 each affixed to an underlying wall member 160a having a front protruding member 164, and the rear face of the blocks 165 which are a variant on the blocks 130 have a groove 42 shaped to fit with and receive the protruding member 164 of a corresponding one of the rails 160, The rails space the rear of the blocks away from the underlying wall member so as to provide an air space therebetween. The rails may be made of metal or wood or any other suitable material.

The mortarless wall structure shown in FIG. 26 further comprises base units 166 having a base rear part 167 engaging a support base and a front part 168 configured to engage the bottom face of an overlying block 165.

Referring to FIGS. 28, 29, 30 and 31 these each show a wall structure analogous to that seen in FIG. 26 except that different block structures are used. FIG. 28 shows a wall structure using the block 145 of FIG. 23. FIG. 29 shows a block 170 wherein the foot element 171 does not engage a lower ledge element of an underlying block 170. FIG. 30 shows a block 175 which has a counter sink for the head 176 of a screw but does not form an air gap between top and bottom intermediate face elements. FIG. 31 shows a block 180 which has a counter sink for the head 176 of a screw but does not form an air gap between top and bottom intermediate face elements and does not have foot and ledge elements.

Referring to FIG. 27 this figure shows a portion of a mortarless wall structure wherein the block are blocks 130 of FIG. 19 and one of the blocks 130 is shown as being held in place against a furring 185 by a bracket 140 by means of a screw 186. The first row of blocks 130 is supported on base elements 187 which are configured to engage the bottom face of block 130. The base elements 187 are in turn supported by a base member fixed to the furring 185.

FIG. 32 shows a front view of a portion of a mortarless wall structure wherein only some of the blocks are attached to wall furrings 190 by attachment means represents by a small circle one of which is designated by the numeral 192. The underlying bas support members 194 are all attached to an underlying wall member.

As shown on FIGS. 33, 34, 35 and 36, the mortarless masonry wall may further comprise finishing units for corners (FIGS. 5, 7 and 8) and windows (FIG. 6), each being shaped to match with the block 130 (as shown in FIGS. 19) while providing the required shape to form the corners and windows.

What is claimed is:

1. A tongue and mortise block, for use in the construction of a wall wherein a plurality of like blocks are stacked in successive mortarless overlapping courses so as to define a wall face, said tongue and mortise block comprising
two side ends spaced apart by
a top face
a bottom face
a front face and
a rear face
said top face comprising a tongue interlock element and a declining face portion, said declining face portion connecting the tongue interlock element to the front face, said bottom face comprising a mortise interlock element and a forward face portion, said forward face portion connecting the mortise interlock element to the front face, said two side ends, said top face, said bottom face, said front face and said rear face being configured such that, when said block and an underlying, like, block form part of the wall and the bottom face of the block engages the top face of a said underlying, like, block such that the front face of the block defines a portion of the wall face, the tongue interlock element of said underlying block is able to register in the mortise interlock element of the block so as to be able to interlock both blocks such that relative forward and rearward displacement is inhibited, and the front face of the block is vertically offset downwardly relative to the tongue element and the rear face thereof.

2. A tongue and mortise block as defined in claim 1 wherein said declining face portion is a declining drainage portion.

3. A tongue and mortise block, for use in the construction of a wall wherein a plurality of like tongue and mortise blocks are stacked in successive mortarless overlapping courses so as to define a wall face, said tongue and mortise block comprising two side ends spaced apart by
a top face
a bottom face
a front face and
a rear face
said top face comprising a tongue interlock element and a declining drainage face portion, said drainage face portion connecting the tongue interlock element to the front face, said bottom face comprising a mortise interlock element and a forward face portion, said forward face portion connecting the mortise interlock element to the front face, said two side ends, said top face, said bottom face, said front face and said rear face being configured such that, when said tongue and mortise block and an underlying, like, block form part of the wall and the bottom face of said tongue and mortise block engages the top face of the underlying, like, block such that the front face of said tongue and mortise block defines a portion of the wall face, the tongue interlock element of the underlying like, block registers in the mortise interlock element of said tongue and mortise block so as to interlock both blocks such that relative forward and rearward displacement is inhibited, the front face of said tongue and mortise block is vertically offset downwardly relative to the tongue element and the rear face thereof, and the forward face portion of the bottom face of said tongue and mortise block and the drainage face portion of the top face of the underlying, like, block are spaced apart and define side walls of a drainage air gap therebetween.

4. A tongue and mortise block, for use in the construction of a wall wherein a plurality of like tongue and mortise blocks are stacked in successive mortarless overlapping courses so as to define a wall face, said tongue and mortise block comprising
two side ends spaced apart by
a top face
a bottom face
a front face and
a rear face
said top face comprising a tongue interlock element and a declining drainage face portion, said declining drainage face portion comprising a ledge element and a top intermediate face element, said top intermediate face element connecting the tongue interlock element to the ledge element, said ledge element connecting the top intermediate face element to the front face, said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate face element to the front face, said two side ends, said top face, said bottom face, said front face and said rear face being configured such that, when said tongue and mortise block and an underlying, like, block form part of the wall and the bottom face of said tongue and mortise block engages the top face of the underlying, like, block such that the front face of said tongue and mortise block defines a portion of the wall face, the tongue inter lock element of the underlying, like, block registers in the mortise interlock element of said tongue and mortise block so as to interlock both blocks such that relative forward and rearward displacement is inhibited, the front face of said tongue and mortise block is vertically offset downwardly relative to the tongue element and the rear face thereof, the foot element of the forward face portion of said tongue and mortise block engages the ledge element of the underlying, like, block, and the bottom intermediate face element of said tongue and mortise block and the top intermediate face element of the underlying, like, block are spaced apart and define side walls of a drainage air gap there between.

5. A tongue and mortise block as defined in claim 4 wherein the top and bottom intermediate face elements of said tongue and mortise block are configured such that, when said tongue and mortise block and the underlying, like, block form part of the wall and the bottom face of said tongue and mortise block engages the top face of the underlying, like, block, the bottom intermediate face element of said tongue and mortise block and the top intermediate face element of the underlying, like, block define side walls of a drainage air gap of a wedge shape, said wedge shaped gap having a wide part and a lower narrow end, said wide part being disposed toward the interlocked tongue and mortise elements, said lower narrow end being disposed toward the engaged foot and ledge elements.

6. A tongue and mortise block as defined in claim 1 wherein the tongue and mortise elements of said tongue and mortise block are disposed adjacent the rear face thereof and each longitudinally extend from one side end of said tongue and mortise block to the other said thereof.

7. A tongue and mortise block as defined in claim 4, wherein the rear face of said tongue and mortise block has a longitudinal recess extending between the side ends thereof, the longitudinal recess being configured and sized to engage a lining rail affixed to a support means.

8. A tongue and mortise block as defined in claim 4 wherein the rear face thereof comprise s an upper rear face element and a lower remaining rear face element, said upper rear face element being disposed adjacent the top face of said tongue and mortise block, said upper rear face element comprising a projection for engaging a support means disposed opposite the rear face of said tongue and mortise block, said lower remaining rear face element being forwardly inset relative to the projection of the upper rear face element.

9. A tongue and mortise block as defined in claim 4 wherein said tongue and mortise block includes means for allowing the attachment of said tongue and mortise block to a support means disposed opposite the rear face thereof.

10. A tongue and mortise block as defined in claim 9 wherein the means for allowing attachment of said tongue and mortise block comprises a guide groove for facilitating the drilling of an aperture through said tongue and mortise block from said top intermediate face element to the rear face of said tongue and mortise block, said guide groove being disposed in the top intermediate face element and extending from one side end of said tongue and mortise block to the other side end thereof.

11. A tongue and mortise block, for use in the construction of a wall wherein a plurality of like tongue and mortise blocks are stacked in successive mortarless overlapping courses so as to define a wall face, said tongue and mortise block comprising
two side ends spaced apart by
a top face
a bottom face
a front face and
a rear face
said top face comprising a tongue interlock element and a declining drainage face portion, said declining face portion comprising a ledge element and a top intermediate face element, said top intermediate face element connecting the tongue interlock element to the ledge element, said ledge element connecting the top intermediate face element to the front face, said bottom face comprising a mortise interlock element and a forward face portion, said forward face portion connecting the mortise interlock element to the front face, said two side ends, said top face, said bottom face, said front face and said rear face being configured such that, when said tongue and mortise block and an underlying, like, block form part of the wall and the bottom face of said tongue and mortise block engages the top face of the underlying, like, block such that the front face of said tongue and mortise block defines a portion of the wall face, the tongue interlock element of the underlying, like, block registers in the mortise interlock element of said tongue and mortise block so as to interlock both blocks such that relative forward and rearward displacement is inhibited, and the front face of said tongue and mortise block is vertically offset downwardly relative to the tongue element and the rear face thereof, and wherein said ledge element and said top intermediate face element of said tongue and mortise block are disposed such that the ledge element and the top intermediate face element thereof define an obtuse angle therebetween and when said tongue and mortise block and the underlying, like, block form part of the wall and the bottom face of said tongue and mortise block engages the top face of the underlying, like, block, the ledge element is disposed such that the wall face and the ledge element define an acute angle therebetween and the top intermediate face element is disposed such that the wall face and the top intermediate face element define an acute angle therebetween.

12. A tongue and mortise block, for use in the construction of a wall wherein a plurality of like tongue and mortise blocks are stacked in successive mortarless overlapping courses so as to define a wall face said tongue and mortise block comprising
two side ends spaced apart by
a top face
a bottom face
a front face and
a rear face
said top face comprising a tongue interlock element and a declining drainage face portion, said declining drainage face portion comprising a ledge element and a top intermediate face element, said top intermediate face element connecting the tongue interlock element to the ledge element, said ledge element connecting the top intermediate face element to the front face, said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate face element to the front face, said two side ends, said top face, said bottom face, said front face and said rear face being configured such that, when said tongue and mortise block and an underlying, like, block form part of the wall and the bottom face of said tongue and mortise block engages the top face of the underlying, like, block such that the front face of said tongue and mortise block defines a portion of the wall face, the tongue interlock element of the underlying, like, block registers in the mortise interlock element of said tongue and mortise block so as to interlock both blocks such that relative forward and rearward displacement is inhibited, the front face of said tongue and mortise block is vertically offset downwardly relative to the tongue element and the rear face thereof, the foot element of the forward face portion of said tongue and mortise block engages the ledge element of the underlying, like, block, and the bottom intermediate face element of said tongue and mortise block and the top intermediate face element of the underlying, like, block are spaced apart and define side walls of a drainage air gap therebetween, and wherein said ledge element and said top intermediate face element of said tongue and mortise block are disposed such that the ledge element and the top intermediate face element thereof define an obtuse angle therebetween and when said tongue and mortise block and the underlying, like, block form part of the wall and the bottom face of said tongue and mortise block engages the top face of the underlying, like, block, the ledge element is disposed such that the wall face and the ledge element define an acute angle therebetween and the top intermediate face element is disposed such that the wall face and the top intermediate face element define an acute angle therebetween.

13. A tongue and mortise block as defined in claim 12 wherein the top and bottom intermediate face elements of said tongue and mortise block are configured such that, when said tongue and mortise block and the underlying, like, block form part of the wall and the bottom face of said tongue and mortise block engages the top face of the underlying, like, block, the bottom intermediate face element of said tongue and mortise block and the top intermediate face element of the underlying, like, block define side walls of a drainage air gap of a wedge shape, said wedge shaped gap having a wide part and a lower narrow end, said wide part being disposed toward the interlocked tongue and mortise elements, said lower narrow end being disposed toward the engaged foot and ledge elements.

14. A tongue and mortise block as defined in claim 12 wherein the tongue and mortise elements of said tongue and mortise block are disposed adjacent the rear face thereof and each longitudinally extend from one side end of said tongue and mortise block to the other side end thereof.

15. A tongue and mortise block as defined in claim 12, wherein the rear face of said tongue and mortise block has a longitudinal recess extending between the side ends thereof, the longitudinal recess being configured and sized to engage a lining rail affixed to the support means.

16. A tongue and mortise block as defined in claim 12 wherein the mortise element of said tongue and mortise block is sized and configured relative to the tongue element thereof so as to permit limited adjustment of said tongue and mortise block perpendicularly to the wall face when said tongue and mortise block is initially disposed on the underlying, like, block.

17. A tongue and mortise block as defined in claim 16 wherein the rear face thereof comprises an upper rear face element and a lower remaining rear face element, said upper rear face element being disposed adjacent the top face of said tongue and mortise block, said upper rear face element comprising a projection for engaging a support means disposed opposite the rear face of said tongue and mortise block, said lower remaining rear face element being forwardly inset relative to the projection of the upper rear face element.

18. A tongue and mortise block as defined in claim 12 wherein said tongue and mortise block includes means for allowing the attachment of said tongue and mortise block to a support means disposed opposite the rear face thereof.

19. A tongue and mortise block as defined in claim 18 wherein the means for allowing attachment of said tongue and mortise block comprises a guide groove for facilitating the drilling of an aperture through said tongue and mortise block from said top intermediate face element to the rear face of said tongue and mortise block, said guide groove being disposed in the top intermediate face element and extending from one side end of said tongue and mortise block to the other side end thereof.

20. A wall wherein a plurality of like tongue and mortise blocks are stacked in successive mortarless overlapping courses so as to define a wall face, each said tongue and mortise block comprising:

two side ends spaced apart by
    a top face
    a bottom face
    a front face and
    a rear face
  said top face comprising a tongue interlock element and a declining face portion, said declining face portion connecting the tongue interlock element to the front face, said bottom face comprising a mortise interlock element and a forward face portion, said forward face portion connecting the mortise interlock element to the front face, said two side ends, said top face, said bottom face, said front face and said rear face being configured such that, when a tongue and mortise block and an underlying, like, block form part of the wall and the bottom face of said tongue and mortise block engages the top face of the underlying, like, block such that the front face of said tongue and mortise block defines a portion of the wall face, the tongue interlock element of the underlying block registers in the mortise interlock element of said tongue and mortise block so as to interlock both blocks such that relative forward and rearward displacement is inhibited, and the front face of said tongue and mortise block is vertically offset downwardly relative to the tongue element thereof, and wherein at least some of said tongue and mortise blocks include means for allowing the attachment thereof to a support means disposed opposite the rear face thereof and at least some of said tongue and mortise blocks which are provided with means for the attachment thereof to said support means are attached to said support means by respective attachment means exploiting respective means for allowing attachment thereof to the support means.

21. A wall as defined in claim 20 wherein adjacent tongue and mortise blocks of each course of tongue and mortise blocks define a joint therebetween and at least one course of tongue and mortise blocks comprises tongue and mortise blocks which engage a respective pair of adjacent underlying tongue and mortise blocks in an underlying course of tongue and mortise blocks and straddle the joint between said pair of adjacent underlying tongue and mortise blocks.

22. A wall as defined in claim 20 wherein said tongue and mortise elements of each of said tongue and mortise blocks are respectively disposed adjacent the rear face thereof and the tongue and mortise elements of each of said tongue and mortise blocks extends longitudinally from one side end thereof to the other side end thereof.

23. A wall as defined in claim 20, wherein the tongue element of said tongue and mortise blocks comprises means for allowing the attachment of said tongue and mortise blocks to said support means, said allowing means comprising an inset seat element configured to engage a chevron-shaped bracket affixed to the support means.

24. A wall as defined in claim 20, wherein the rear faces of said tongue and mortise blocks have a longitudinal recess extending between the side ends thereof, the longitudinal recess being configured and sized to engage a lining rail affixed to the support means.

25. A wall as defined in claim 20 wherein for each of said tongue and mortise blocks, the rear face thereof comprises an upper rear face element and a remaining rear face element, said upper rear face element of each of said tongue and mortise block being disposed adjacent the top face of said tongue and mortise block, said upper rear face element of each of said tongue and mortise block comprising a projection for engaging a support means disposed opposite the rear face of each tongue and mortise block, said remaining rear face element being forwardly inset relative to the projection of the upper rear face element of each of said tongue and mortise block.

26. A wall as defined in claim 20 wherein said means for allowing attachment to a support means comprises a guide groove for facilitating the drilling of an aperture through the block from said top intermediate face element to the rear face of the block, said guide groove being disposed in the top intermediate face element and extending from one side end of the block to the other side end thereof.

27. A wall as defined in claim 20, wherein said means for allowing attachment to a support means comprises aperture extending from a respective top intermediate face element to a respective rear face thereof.

28. A wall as defined in claim 27 wherein the aperture is countersunk at the top intermediate face thereof.

29. A wall wherein a plurality of like tongue and mortise blocks are stacked in successive mortarless overlapping courses so as to define a wall face,
  each said tongue and mortise block comprising:
    two side ends spaced apart by
      a top face
      a bottom face
      a front face and
      a rear face
    said top face comprising a tongue interlock element and a declining face portion, said declining face portion comprising a ledge element and a top intermediate face element, said top intermediate face element connecting the tongue interlock element to the ledge element, said ledge element connecting the top intermediate face element to the front face,
    said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate face element to the front face,
  said two side ends, said top face, said bottom face, said front face and said rear face being configured such that, when a tongue and mortise block and an underlying, like, block form part of the wall and the bottom face of said tongue and mortise block engages the top face of the underlying, like, block such that the front face of said tongue and mortise block defines a portion of the wall face,
    the tongue interlock element of the underlying, like, block registers in the mortise interlock element of said tongue and mortise block so as to interlock both blocks such that relative forward and rearward displacement is inhibited,
    the front face of said tongue and mortise block is vertically offset downwardly relative to the tongue element thereof,
    the foot element of the forward face portion of said tongue and mortise block engages the ledge element of the underlying, like, block
  and
    wherein at least some of said tongue and mortise blocks include means for allowing the attachment thereof to a support means disposed opposite the rear face thereof and at least some of said tongue and mortise blocks which are provided with means for allowing the attachment thereof to said support means are attached to said support means by respective attachment means exploiting respective means for allowing attachment thereof to the support means.

30. A wall as defined in claim 29 wherein adjacent tongue and mortise blocks of each course of tongue and mortise blocks define a respective joint therebetween and a respective tongue and mortise block in an upper course of tongue and mortise blocks straddles said respective joint and engages the underlying adjacent tongue and mortise blocks defining said respective joint.

31. A wall as defined in claim 29 wherein said tongue and mortise elements of each of said tongue and mortise blocks are respectively disposed adjacent the rear face thereof and the tongue and mortise elements of each of said tongue and mortise blocks extends longitudinally from one side end thereof to the other side end thereof.

32. A wall as defined in claim 29 wherein said ledge element and said top intermediate face element of each of said tongue and mortise blocks are disposed such that the ledge element and the top intermediate face element define an obtuse angle therebetween, the ledge element is disposed such the wall face and the ledge element define an acute angle therebetween and the top intermediate face element is disposed such the wall face and the top intermediate face element define an acute angle therebetween.

33. A wall as defined in claim 29, wherein the tongue element of said tongue and mortise blocks comprises means for allowing the attachment of said tongue and mortise blocks to said support means, said allowing means comprising an inset seat element configured to engage a chevron-shaped bracket affixed to the support means.

34. A wall as defined in claim 29, wherein the rear faces of said tongue and mortise blocks have a longitudinal recess extending between the side ends thereof, the longitudinal recess being configured and sized to engage a lining rail affixed to the support means.

35. A wall as defined in claim 29 wherein for each of said tongue and mortise blocks, the rear face thereof comprises an upper rear face element and a remaining rear face element, said upper rear face element of each of said tongue and mortise block being disposed adjacent the top face of said tongue and mortise block, said upper face element of each of said tongue and mortise block comprising a projection for engaging a support means disposed opposite the rear face of each said tongue and mortise block, said remaining rear face element of each of said tongue and mortise block being forwardly inset relative to the projection of the upper rear face element of each of said tongue and mortise block.

36. A wall as defined in claim 29 wherein said means for allowing attachment to a support means comprises a guide groove for facilitating the drilling of an aperture through the block from said top intermediate face element to the rear face of the block, said guide groove being disposed in the top intermediate face element and extending from one side end of the block to the other side end thereof.

37. A wall as defined in claim 29, wherein said means for allowing attachment to a support means comprises an aperture extending from a respective top intermediate face element to a respective rear face thereof.

38. A wall as defined in claim 37 wherein the aperture is countersunk at the top intermediate face thereof.

39. A wall wherein a plurality of like tongue and mortise blocks are stacked in successive mortarless overlapping courses so as to define a wall face thereof, each said tongue and mortise block comprising:
two side ends spaced apart by
a top face
a bottom face
a front face and
a rear face
said top face comprising a tongue interlock element and a declining drainage face portion, said declining drainage face portion comprising a ledge element and a top intermediate face element, said top intermediate face element connecting the tongue interlock element to the ledge element, said ledge element connecting the top intermediate face element to the front face,
said bottom face comprising a mortise interlock element and a forward face portion, said forward face portion comprising a foot element and a bottom intermediate face element, said bottom intermediate face element connecting the mortise interlock element to the foot element, said foot element connecting the bottom intermediate element face to the front face,
said two side ends, said top face, said bottom face, said front face and said rear face being configured such that, when a tongue and mortise block and an underlying, like, block form part of the wall and the bottom face of said tongue and mortise block engages the top face of the underlying, like, block such that the front face of said tongue and mortise block defines a portion of the wall face,
the tongue interlock element of the underlying, like, block registers in the mortise interlock element of said tongue and mortise block so as to interlock both blocks such that relative forward and rearward displacement is inhibited,
the front face of said tongue and mortise block is vertically offset downwardly relative to the tongue element thereof,
the foot element of the forward face portion of said tongue and mortise block engages the ledge element of the underlying, like, block, and the bottom intermediate face element of said tongue and mortise block and the top intermediate face element of the underlying, like, block are spaced apart and define side walls of a drainage air gap therebetween, and
wherein at least some of said tongue and mortise blocks include means for allowing the attachment thereof to a support means disposed opposite the rear face thereof and at least some of said tongue and mortise blocks which are provided with means for allowing attachment thereof to said support means, are attached to said support means by respective attachment means exploiting respective means for allowing attachment thereof to the support means.

40. A wall as defined in claim 39 wherein adjacent tongue and mortise blocks of each course of tongue and mortise blocks define a respective joint therebetween and wherein a tongue and mortise block in an upper course of tongue and mortise blocks straddles a respective joint and engages the underlying adjacent tongue and mortise blocks defining said respective joint.

41. A wall as defined in claim 39 wherein said tongue and mortise elements of each of said tongue and mortise blocks are respectively disposed adjacent the rear face thereof and the tongue and mortise elements of each of said tongue and mortise blocks extends longitudinally from one side end thereof to the other side end thereof.

42. A wall as defined in claim 39, wherein the tongue element of said tongue and mortise blocks comprises means for allowing the attachment of said tongue and mortise blocks to said support means, said allowing means comprising an inset seat element configured to engage a chevron-shaped bracket affixed to the support means.

43. A wall as defined in claim 39, wherein the rear faces of said tongue and mortise blocks have a longitudinal recess extending between the side ends thereof, the longitudinal recess being configured and sized to engage a lining rail affixed to the support means.

44. A wall as defined in claim 39 wherein for each of said tongue and mortise blocks, the rear face thereof comprises an upper rear face element and a remaining rear face element, said upper rear face element of each of said tongue and mortise block being disposed adjacent the top face of said tongue and mortise block, said upper rear face element of each of said tongue and mortise block comprising a projection for engaging a support means disposed opposite the rear face of each said tongue and mortise block, said remaining rear face element of each of said tongue and mortise block being forwardly inset relative to the projection of the upper rear face element of each of said tongue and mortise block.

45. A wall as defined in claim 39 wherein said drainage air gap is divided into a plurality of communicating decompression chambers.

46. A wall as defined in claim 39 wherein said means for allowing attachment to a support means comprises a guide groove for facilitating the drilling of an aperture through the block from said top intermediate face element to the rear face of the block, said guide groove being disposed in the top intermediate face element and extending from one side end of the block to the other side end thereof.

47. A wall as defined in claim 39 wherein the top and bottom intermediate face elements of said tongue and mortise blocks are configured such that the bottom intermediate face element of a tongue and mortise block and the top intermediate face element of a respective underlying, like, block define side walls of a drainage air gap of a wedge shape, said wedge shaped gap having a wide part and a lower narrow end, said wide part being disposed toward the interlocked tongue and mortise elements thereof, said lower narrow end being disposed toward the engaged foot and ledge elements thereof.

48. A wall as defined in claim 47 wherein said drainage air gap is divided into a plurality of communicating decompression chambers.

49. A wall as defined in claim 39 wherein for each of said tongue and mortise blocks said ledge element and said top intermediate face element are disposed such that the ledge element and the top intermediate element define an obtuse angle therebetween, the ledge element is disposed such the wall face and the ledge element define an acute angle therebetween and the top intermediate face element is disposed such the wall face and the top intermediate face element define an acute angle therebetween.

50. A wall as defined in claim 49 wherein said drainage air gap is divided into a plurality of communicating decompression chambers.

51. A wall as defined in claim 39, wherein said means for allowing attachment to a support means comprises an aperture extending from a respective top intermediate face element to a respective rear face thereof.

52. A wall as defined in claim 51 wherein the aperture is countersunk at the top intermediate face thereof.

* * * * *